(12) United States Patent
Yamada et al.

(10) Patent No.: US 11,007,965 B2
(45) Date of Patent: May 18, 2021

(54) AIRBAG DEVICE FOR FRONT PASSENGER SEAT

(71) Applicant: TOYODA GOSEI CO., LTD., Kiyosu (JP)

(72) Inventors: Ikuo Yamada, Kiyosu (JP); Motoyuki Tanaka, Kiyosu (JP)

(73) Assignee: TOYODA GOSEI CO., LTD., Aichi (JP)

( * ) Notice: Subject to any disclaimer, the term of this patent is extended or adjusted under 35 U.S.C. 154(b) by 71 days.

(21) Appl. No.: 16/424,807

(22) Filed: May 29, 2019

(65) Prior Publication Data
US 2020/0010044 A1 Jan. 9, 2020

(30) Foreign Application Priority Data

Jul. 5, 2018 (JP) .............................. JP2018-128579

(51) Int. Cl.
*B60R 21/231* (2011.01)
*B60R 21/2338* (2011.01)
*B60R 21/205* (2011.01)

(52) U.S. Cl.
CPC .... *B60R 21/23138* (2013.01); *B60R 21/2338* (2013.01); *B60R 21/205* (2013.01); *B60R 2021/23382* (2013.01)

(58) Field of Classification Search
CPC ...... B60R 2021/23308; B60R 21/2338; B60R 21/231; B60R 21/23138; B60R 21/233; B60R 21/205; B60R 2021/23382; B60R 2021/0009
See application file for complete search history.

(56) References Cited

U.S. PATENT DOCUMENTS

| | | | |
|---|---|---|---|
| 6,616,184 B2 * | 9/2003 | Fischer | B60R 21/205 280/735 |
| 9,434,344 B2 * | 9/2016 | Fukawatase | B60R 21/2338 |
| 9,840,223 B2 * | 12/2017 | Choi | B60R 21/233 |
| 10,029,643 B2 * | 7/2018 | Spahn | B60R 21/233 |
| 10,293,775 B2 * | 5/2019 | Wang | B60R 21/205 |
| 10,336,280 B2 * | 7/2019 | Faruque | B60R 21/2338 |
| 10,427,638 B2 * | 10/2019 | Choi | B60R 21/233 |

(Continued)

FOREIGN PATENT DOCUMENTS

JP 2016-020115 A 2/2016

*Primary Examiner* — Ruth Ilan
*Assistant Examiner* — Mary E Young
(74) *Attorney, Agent, or Firm* — Posz Law Group, PLC

(57) ABSTRACT

An airbag device includes an airbag. A passenger protection portion of the airbag has a frontal collision restraint surface, an oblique collision restraint surface, and a restraint recess portion. The airbag has a recess portion tether that couples a tip side of a recess of the restraint recess portion and a front end side of the airbag to each other, and at least one longitudinal tether that couples the front end side of the airbag and a recess portion-side region that is located on the restraint recess portion side with respect to a center of the frontal collision restraint surface in a lateral direction to each other, inside the airbag. The frontal collision restraint surface has at least two protruding surfaces that are configured to protrude backward, due to the longitudinal tether. The at least two protruding surfaces are arranged in alignment in the lateral direction.

11 Claims, 16 Drawing Sheets

(56) References Cited

U.S. PATENT DOCUMENTS

| | | | |
|---|---|---|---|
| 2002/0158456 A1* | 10/2002 | Fischer | B60R 21/205 280/743.2 |
| 2006/0049618 A1* | 3/2006 | Bito | B60R 21/2346 280/732 |
| 2013/0001934 A1* | 1/2013 | Nagasawa | B60R 21/203 280/731 |
| 2015/0166002 A1* | 6/2015 | Fukawatase | B60R 21/205 280/730.1 |
| 2015/0343986 A1* | 12/2015 | Schneider | B60R 21/205 280/729 |
| 2015/0367802 A1* | 12/2015 | Fukawatase | B60R 21/205 280/732 |
| 2016/0009242 A1* | 1/2016 | Fukawatase | B60R 21/2338 280/730.1 |
| 2017/0136981 A1* | 5/2017 | Fukawatase | B60R 21/2338 |
| 2017/0355344 A1* | 12/2017 | Choi | B60R 21/235 |
| 2017/0355346 A1* | 12/2017 | Kobayashi | B60R 21/0136 |
| 2018/0050654 A1* | 2/2018 | Spahn | B60R 21/205 |
| 2018/0111581 A1* | 4/2018 | Wang | B60R 21/2338 |
| 2018/0126946 A1* | 5/2018 | Bausch | B60R 21/233 |
| 2018/0251093 A1* | 9/2018 | Rose | B60R 21/231 |
| 2018/0361978 A1* | 12/2018 | Belwafa | B60R 21/233 |
| 2019/0111878 A1* | 4/2019 | Faruque | B60R 21/233 |
| 2019/0241147 A1* | 8/2019 | Kanegae | B60R 21/2334 |
| 2019/0291681 A1* | 9/2019 | Nakajima | B60R 21/216 |
| 2019/0351862 A1* | 11/2019 | Aranzulla | B60R 21/231 |
| 2020/0031306 A1* | 1/2020 | Nakajima | B60R 21/264 |
| 2020/0079313 A1* | 3/2020 | Hiraiwa | B60R 21/235 |
| 2020/0086821 A1* | 3/2020 | Nakajima | B60R 21/205 |
| 2020/0094768 A1* | 3/2020 | Hiraiwa | B60R 21/2338 |

* cited by examiner

AIRBAG DEVICE FOR FRONT PASSENGER SEAT

INCORPORATION BY REFERENCE

The disclosure of Japanese Patent Application No. 2018-128579 filed on Jul. 5, 2018 including the specification, drawings and abstract is incorporated herein by reference in its entirety.

BACKGROUND

1. Technical Field

The disclosure relates to an airbag device for a front passenger seat that is equipped with an airbag that is accommodated in a folded state in an accommodation section provided in an instrument panel arranged in front of a passenger sitting in the front passenger seat, that inflates in such a manner as to protrude backward with respect to a vehicle by causing inflation gas to flow thereinto, and that is configured to be able to protect the passenger.

2. Description of Related Art

There is an airbag device for a front passenger seat that is equipped with an airbag that is configured such that a shape upon the completion of inflation thereof is defined by a tether that is disposed therein, and that four protrusion portions that are arranged substantially along a vertical direction are juxtaposed in a lateral direction upon the completion of inflation of the airbag (e.g., see U.S. Pat. No. 9,840,223). In this conventional airbag device for the front passenger seat, the airbag is configured to protect a head of a passenger that moves diagonally forward in the event of an oblique collision, an offset collision, or the like of a vehicle, through the use of a region that is recessed between an outer protrusion portion that is arranged outside in the lateral direction upon the completion of inflation of the airbag, and an inner protrusion portion that is located adjacent to the outer protrusion portion and that is arranged in front of the passenger upon the completion of inflation of the airbag.

SUMMARY

However, in this airbag device for the front passenger seat, the inner protrusion portion that is formed adjacent to the outer protrusion portion is configured to be disposed as far as a lateral center of the airbag, so the curvature of the protruding shape thereof is small. For example, when the head of the passenger that moves diagonally forward deviates toward a center side in the lateral direction and comes into contact with the inner protrusion portion, this inner protrusion portion comes into contact with the head of the passenger over a wide area. Then, a force causing rotation toward the center side of the airbag in the lateral direction substantially along a horizontal direction, namely, reversely to a moving direction of the head is applied to the head of the passenger due to such contact. As a result, it may be impossible to adequately protect the head of the passenger.

The disclosure provides an airbag device for a front passenger seat that can stably protect a head of a passenger that moves diagonally forward even when this head of the passenger is received at a position deviated in a lateral direction.

An airbag device for a front passenger seat according to a first aspect of the disclosure includes an airbag that is accommodated in a folded state in an accommodation section in front of the front passenger seat. The airbag is configured such that a front end side thereof is attached to the accommodation section upon completion of inflation of the airbag, and that a rear surface side thereof serves as a passenger protection portion upon completion of inflation of the airbag. The passenger protection portion has a frontal collision restraint surface that is configured to protect a head of a passenger that moves forward in an event of a frontal collision of a vehicle, an oblique collision restraint surface that is configured to protect the head of the passenger that moves diagonally forward in an event of an oblique collision or an offset collision of the vehicle and that is arranged on at least one of a right side and a left side of the frontal collision restraint surface, and a restraint recess portion that is configured to be recessed forward between the frontal collision restraint surface and the oblique collision restraint surface. The airbag has a recess portion tether that couples a tip side of a recess of the restraint recess portion and the front end side of the airbag to each other, and at least one longitudinal tether that couples the front end side of the airbag and a recess portion-side region that is located on the restraint recess portion side with respect to a center of the frontal collision restraint surface in a lateral direction to each other, inside the airbag. The frontal collision restraint surface has at least two protruding surfaces that are configured to protrude backward upon completion of inflation of the airbag due to the longitudinal tether. The at least two protruding surfaces are arranged in alignment in the lateral direction.

In the aforementioned aspect, the frontal collision restraint surface is configured such that at least the two protruding surfaces are juxtaposed in the lateral direction. The longitudinal tether that forms these two protruding surfaces is configured to be coupled to the recess portion-side region that is located on the restraint recess portion side with respect to the center of the frontal collision restraint surface in the lateral direction. Therefore, the curvature of the protruding surface that is formed adjacent to the restraint recess portion can be made larger than in the case where a single protrusion portion is disposed in a region between the center in the lateral direction and the restraint recess portion (the outer protrusion portion). Therefore, even when the head of the passenger deviates more or less toward the center side in the lateral direction and comes into contact with the recess portion-side region of the frontal collision restraint surface in moving diagonally forward, namely, toward the restraint recess portion side in the event of an oblique collision or an offset collision of the vehicle, there is established an aspect in which the head of the passenger comes into contact only with the protruding surface that is formed adjacent to the restraint recess portion. Moreover, the protruding surface that is formed adjacent to this restraint recess portion is formed in an area with a small lateral width dimension between the restraint recess portion and the longitudinal tether that is coupled to the frontal collision restraint surface at a position deviated toward the restraint recess portion side from the center of the frontal collision restraint surface in the lateral direction. Thus, the protruding surface can be restrained from coming into contact with the head over a wide area, is unlikely to rotate the head reversely to the moving direction thereof, and can directly cause the head to smoothly enter the restraint recess portion after the head comes into contact with the protruding surface. As a result, the head of the passenger can be adequately protected by being caused to enter the restraint recess portion.

Accordingly, in the aforementioned aspect, even when the head of the passenger that moves diagonally forward is received at a position deviated in the lateral direction, it is possible to stably protect the head of the passenger.

Besides, in the aforementioned aspect, the oblique collision restraint surface may be configured to protrude further backward than the frontal collision restraint surface upon completion of inflation of the airbag. Owing to the aforementioned configuration, when the head of the passenger deviates toward the oblique collision restraint surface side (outward in the lateral direction) in moving diagonally forward, the oblique collision restraint surface that is arranged in such a manner as to extend backward from the frontal collision restraint surface can receive the head of the passenger and then guide the head of the passenger toward the restraint recess portion side. Thus, the head of the passenger that moves diagonally forward can be more stably received by the restraint recess portion in the event of an oblique collision or an offset collision, so this configuration is preferable.

Furthermore, in the aforementioned configuration, a recess portion-side protruding surface that is configured to continue from the restraint recess portion may be configured to protrude further backward than an adjacent protruding surface that is arranged adjacent to the recess portion-side protruding surface at a center side thereof in the lateral direction, upon completion of inflation of the airbag, as to the at least two protruding surfaces. Owing to the aforementioned configuration, the head of the passenger that moves diagonally forward can be restrained from coming into contact with the adjacent protruding surface and reliably brought into contact only with the recess portion-side protruding surface that is arranged on the restraint recess portion side. As a result, the protruding surfaces can more adequately restrain the head of the passenger from rotating, so this configuration is preferable.

Furthermore, the airbag device for the front passenger seat may adopt an aspect mentioned below.

An airbag device for a front passenger seat according to a second aspect of the disclosure includes an airbag that is accommodated in a folded state in an accommodation section in front of the front passenger seat. The airbag is configured such that a front end side thereof is attached to the accommodation section upon completion of inflation of the airbag, and that a rear surface side thereof serves as a passenger protection portion upon completion of inflation of the airbag. The passenger protection portion has a frontal collision restraint surface that is configured to protect a head of a passenger that moves forward in an event of a frontal collision of a vehicle, and an oblique collision restraint surface that is configured to protect the head of the passenger that moves diagonally forward in an event of an oblique collision or an offset collision of the vehicle and that is configured to protrude further backward than the frontal collision restraint surface on at least one of a right side and a left side of the frontal collision restraint surface. The airbag has at least two longitudinal tethers that couple the front end side of the airbag and the frontal collision restraint surface to each other, inside the airbag. The at least two longitudinal tethers are arranged deviated in a lateral direction from a center of the frontal collision restraint surface in the lateral direction to an oblique collision-side region on the oblique collision restraint surface side. The frontal collision restraint surface has at least two protruding surfaces that are configured to protrude backward upon completion of inflation of the airbag. The at least two protruding surfaces are arranged in alignment in the lateral direction. An end-side protruding surface that is arranged on the oblique collision restraint surface side is configured to be located in front of an adjacent protruding surface that is arranged adjacent to the end-side protruding surface on a center side thereof in the lateral direction, upon completion of inflation of the airbag, as to the at least two protruding surfaces.

In the aforementioned aspect, the frontal collision restraint surface is configured such that at least the two protruding surfaces are juxtaposed in the lateral direction from the center of the frontal collision restrain surface in the lateral direction to the oblique collision-side region thereof on the oblique collision restraint surface side, and is configured such that the end-side protruding surface that is arranged on the oblique collision restraint surface side is located in front of the adjacent protruding surface that is adjacent to the end-side protruding surface on the center side thereof in the lateral direction, upon the completion of inflation of the airbag. That is, in the airbag device for the front passenger seat configured as described above, the adjacent protruding surface that is arranged on the center side in the lateral direction is configured to be arranged protruding further backward than the end-side protruding surface that is arranged on the oblique collision restraint surface side, upon the completion of inflation of the airbag, and there is created a gap corresponding to the end-side protruding surface between the adjacent protruding surface and the oblique collision restraint surface. Thus, even when the head of the passenger that moves diagonally forward deviates more or less in the lateral direction, it is possible to cause the head of the passenger to smoothly enter the gap between the adjacent protruding surface and the oblique collision restraint surface. Moreover, the head of the passenger can be adequately protected by restraining the head of the passenger from rotating toward the horizontal direction while holding the head of the passenger at three locations, namely, the oblique collision restraint surface, the adjacent protruding surface, and the end-side protruding surface, such that the head of the passenger is sandwiched by the adjacent protruding surface and the oblique collision restraint surface.

Accordingly, in the aforementioned aspect as well, even when the head of the passenger that moves diagonally forward is received at a position deviated in the lateral direction, it is possible to stably protect the head of the passenger.

Besides, in the aforementioned aspect, the airbag may have a restraint recess portion that is configured to be recessed forward between the frontal collision restraint surface and the oblique collision restraint surface. The airbag may have a recess portion tether that couples a tip side of a recess of the restraint recess portion and the front end side of the airbag to each other, inside the airbag. The recess portion tether may also serve as one of the at least two longitudinal tethers. Owing to the aforementioned configuration, the head of the passenger that moves diagonally forward can be protected by being caused to further enter the restraint recess portion after being caused to enter the space between the adjacent protruding surface and the oblique collision restraint surface. As a result, the head of the passenger can be more adequately protected, so this configuration is preferable.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 8:
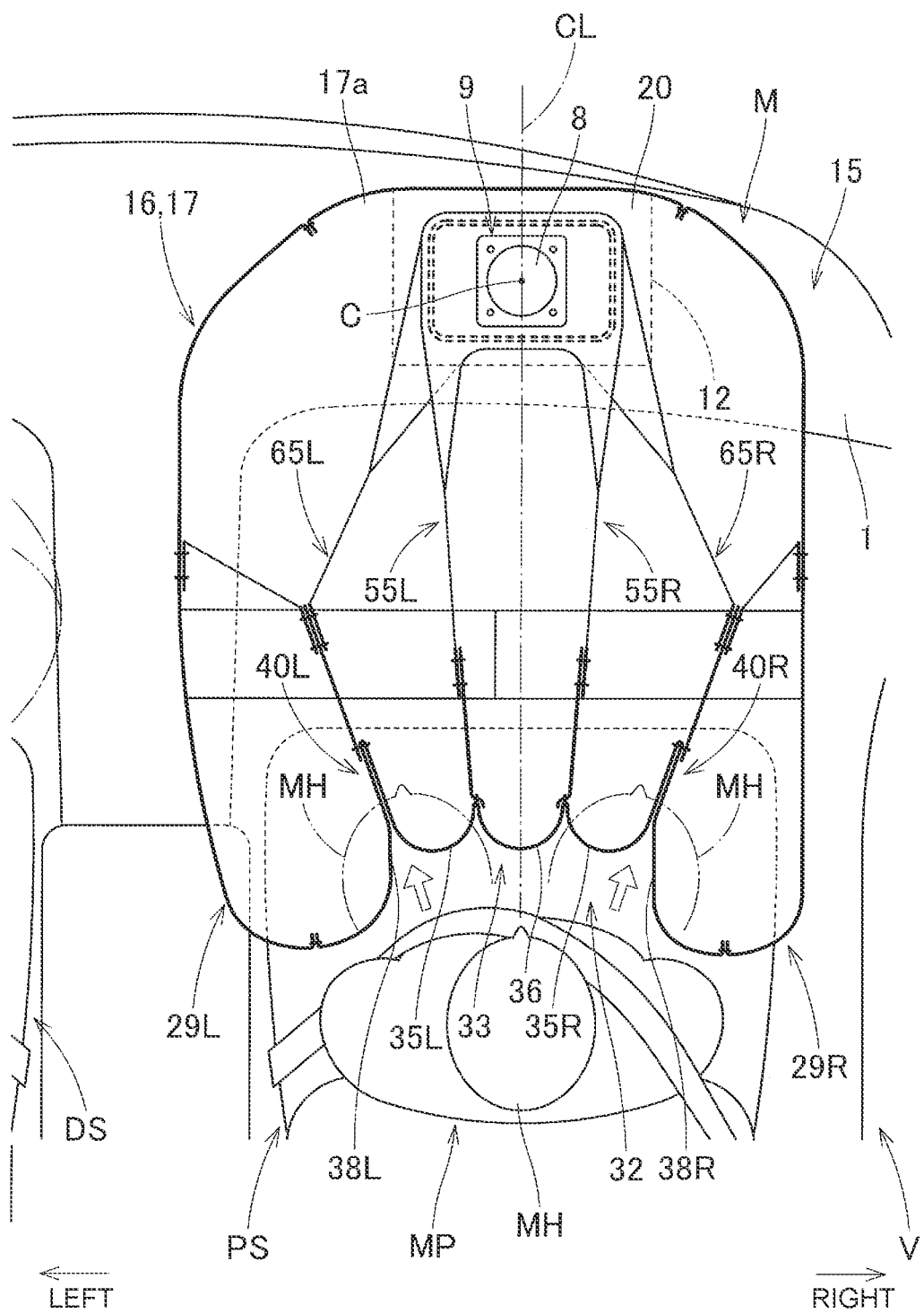
FIG. 8 is a schematic lateral sectional view showing a state where the airbag has been inflated, in the airbag device for the front passenger seat according to the embodiment.

One of the embodiments of the disclosure will be described hereinafter based on the drawings. As shown in FIG. 8, an airbag device M for a front passenger seat (hereinafter abbreviated simply as "an airbag device") according to the embodiment is arranged inside an instrument panel 1, in front of a front passenger seat PS of a vehicle V as a left-hand drive vehicle having the front passenger seat PS arranged on a right side thereof. Incidentally, in the embodiment, longitudinal, vertical, and lateral directions coincide with longitudinal, vertical, and lateral directions of the vehicle V respectively, unless otherwise specified.

As shown in FIG. 8, the airbag device M according to the embodiment is equipped with an airbag 15, an inflator 8 that supplies inflation gas to the airbag 15, a case 12 as an accommodation section that accommodates and holds the airbag 15 and the inflator 8, and a retainer 9 for attaching the airbag 15 and the inflator 8 to the case 12. Besides, although not depicted in detail, the airbag device M is configured to be equipped also with an airbag cover that covers a space above the folded airbag 15 and that has a door portion capable of opening at the time of deployment and inflation of the airbag 15. In the embodiment, the inflator 8 is configured to operate in the event of a frontal collision, an oblique collision, and an offset collision of the vehicle V.

As shown in FIGS. 1 to 5, the airbag 15 is configured to be equipped with a bag body 16 that inflates by causing inflation gas to flow thereinto, and tethers 50, 52, 55R, 55L, 65R, and 65L that are arranged inside the bag body 16 to define a shape of the bag body 16 upon the completion of inflation of the airbag.

The bag body 16 assumes the shape of a bag that is formed from a flexible sheet body. In the case of the embodiment, as shown in FIGS. 1 to 5, the bag body 16 is equipped with a body inflation portion 17, and two protruding inflation portions, namely, a right protruding inflation portion 29R and a left protruding inflation portion 29L that are arranged in such a manner as to protrude backward from the body inflation portion 17 upon the completion of inflation of the airbag. Incidentally, the airbag 15 according to the embodiment is substantially bilaterally symmetric except in that the thicknesses (the width dimensions in the lateral direction) of the right protruding inflation portion 29R and the left protruding inflation portion 29L upon the completion of inflation of the airbag are made slightly different from each other. Therefore, a section that is arranged on the left side upon the completion of inflation of the airbag will be mainly described in detail, and the detailed description of a section that is arranged on the right side upon the completion of inflation of the airbag will be omitted by assigning the same reference symbols thereto.

Figure 1:
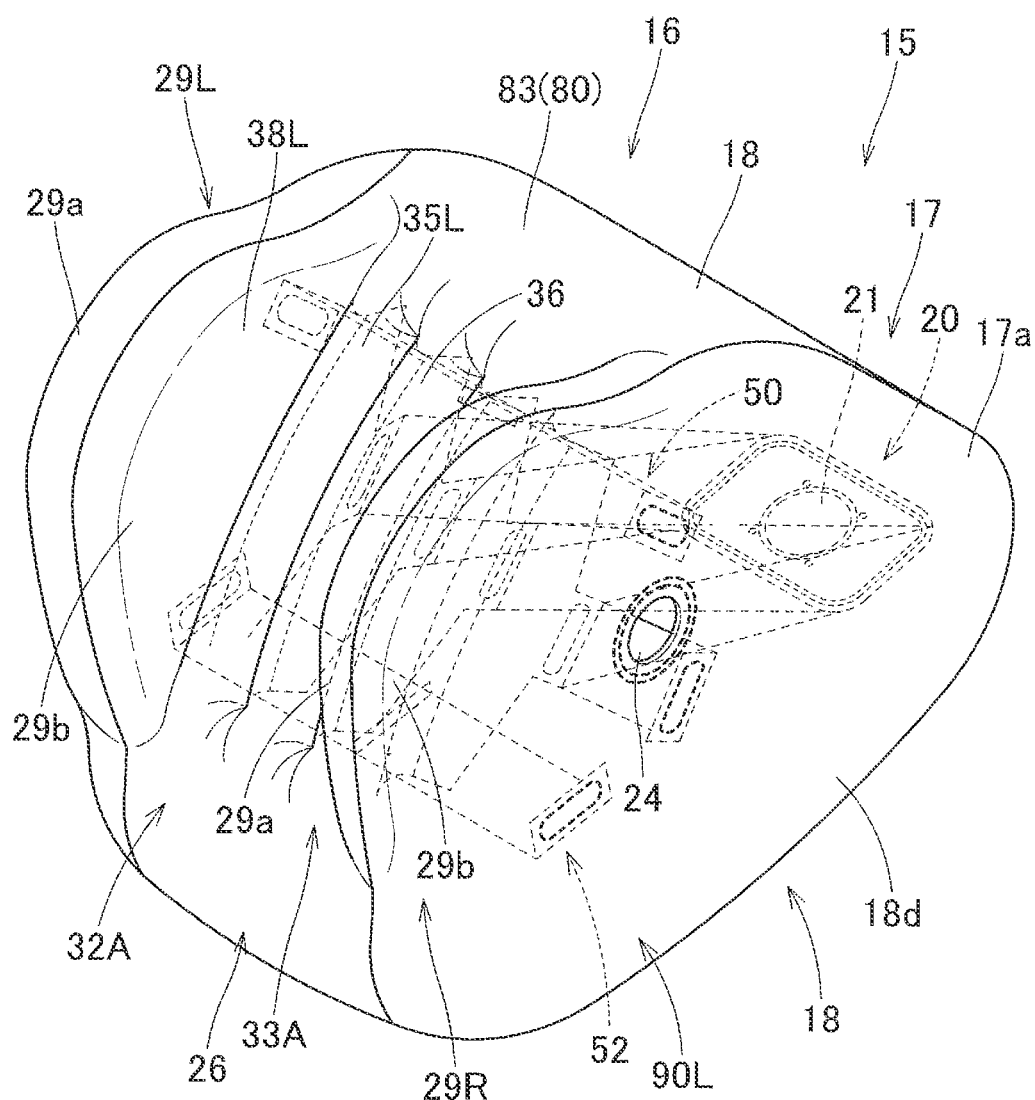
FIG. 1 is a perspective view showing a state where an airbag used in an airbag device for a front passenger seat according to one of the embodiments of the disclosure is inflated alone, as viewed from a right, diagonally rear side.
Figure 2:
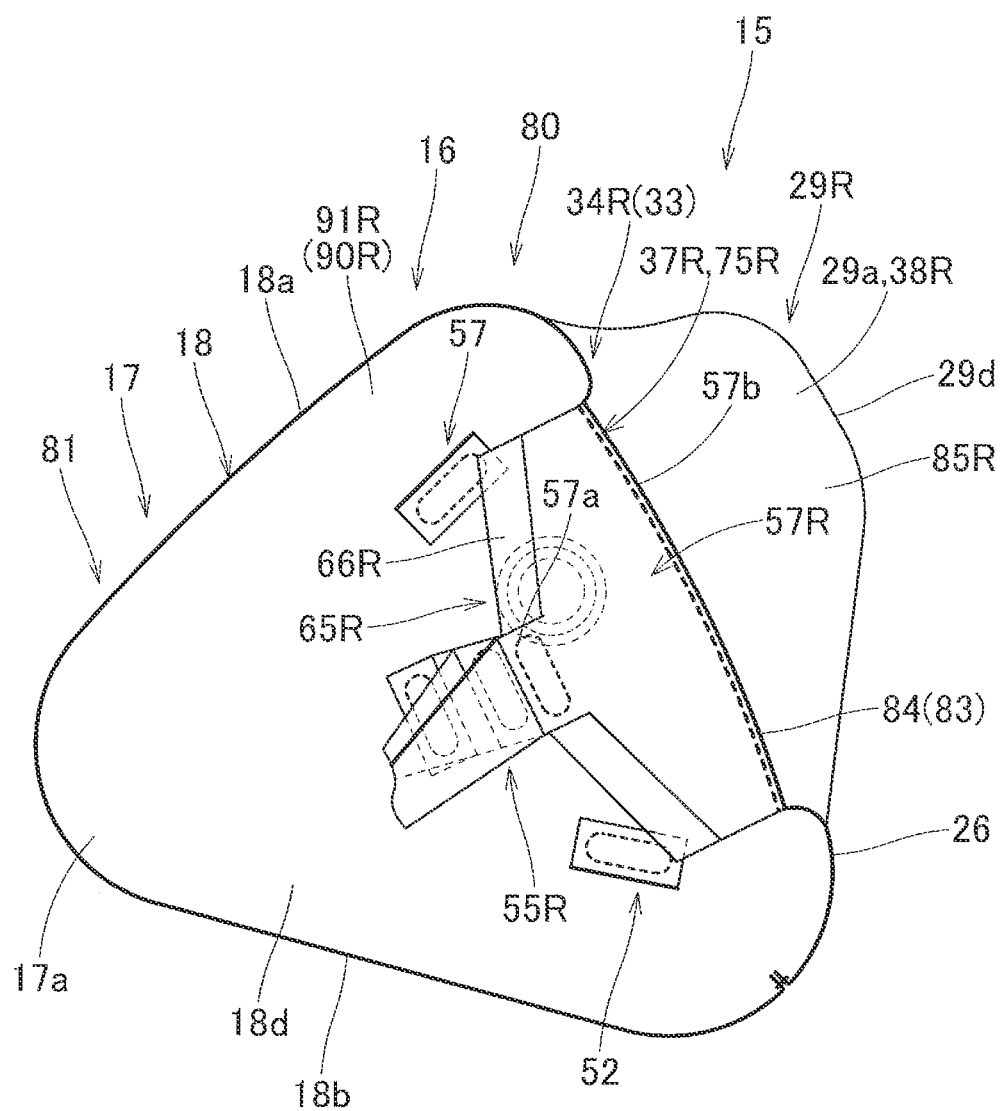
FIG. 2 is a schematic longitudinal sectional view of the airbag of FIG. 1, and is a cross-sectional view of a boundary section between protruding surfaces.
Figure 3:
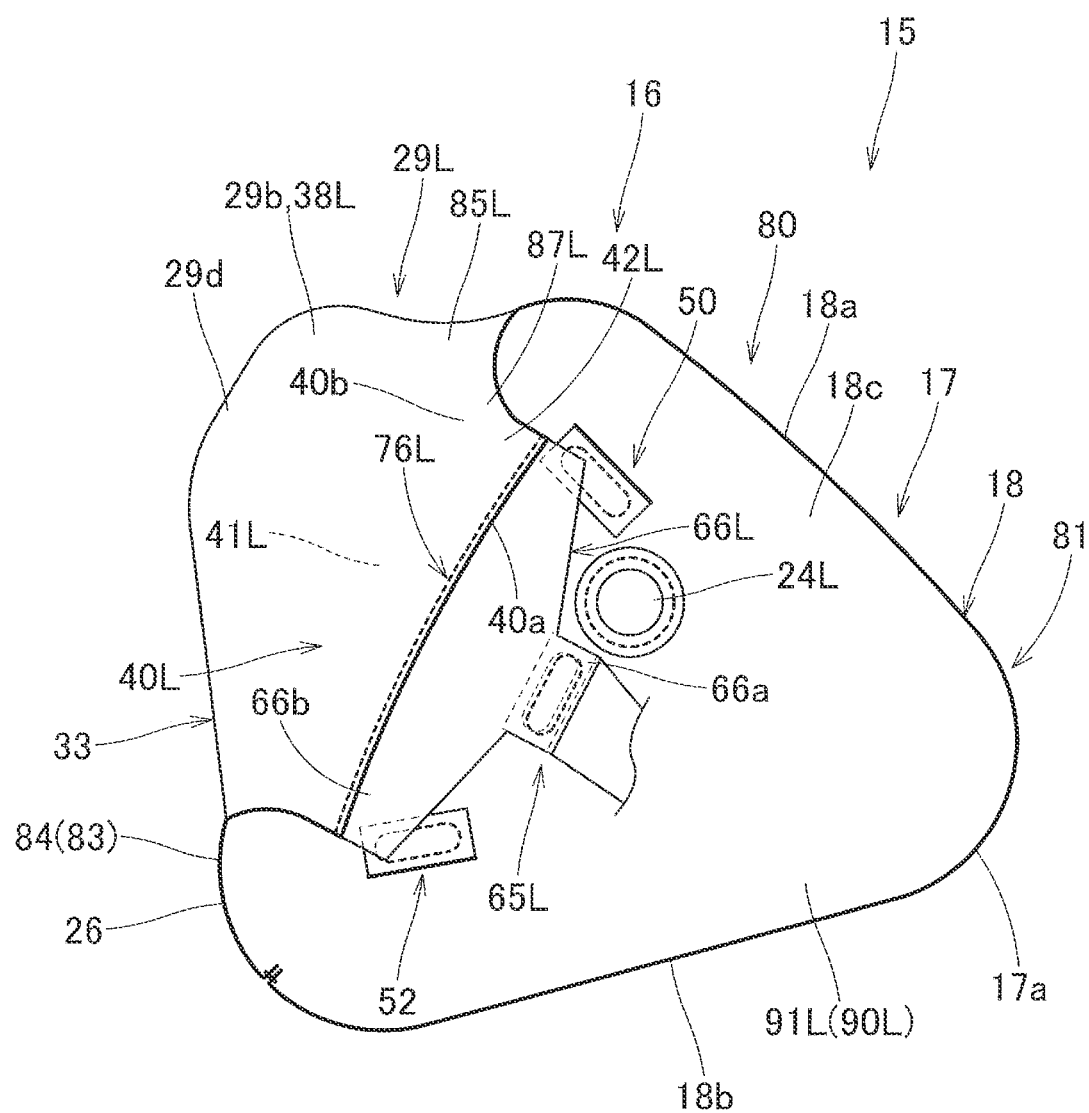
FIG. 3 is a schematic longitudinal sectional view of the airbag of FIG. 1, and is a cross-sectional view of a section of a restraint recess portion.

The body inflation portion 17 is arranged between the instrument panel 1 and a windshield (not shown) upon the completion of inflation of the airbag. The body inflation portion 17 substantially assumes the shape of a triangle whose axis substantially extends along the lateral direction upon the completion of inflation of the airbag as shown in FIGS. 1 to 3, and is configured to be equipped, on a front end 17a side thereof upon the completion of inflation of the airbag, with an attachment portion 20 that is attached to the case 12 (see FIGS. 1, 4, and 8). That is, in the airbag 15 according to the embodiment, the body inflation portion 17 is attached on the front end 17a side thereof to the case 12. Besides, in the airbag 15 according to the embodiment, the body inflation portion 17 is configured to be arranged such that a left region thereof, namely, a driver seat DS side (a vehicle interior side) thereof slightly bulges out toward the driver seat DS side upon the completion of inflation of the airbag as shown in FIG. 8. The body inflation portion 17 is equipped with a rear wall portion 26 that is arranged on a rear surface side, namely, a passenger MP side upon the completion of inflation of the airbag, and a tapered peripheral wall portion 18 that extends forward from a peripheral edge of the rear wall portion 26 and that is converged such that the vertical width dimension thereof is reduced as the distance to the front end side shortens.

The peripheral wall portion 18 is a section that is arranged mainly between the instrument panel 1 and the windshield (not shown) upon the completion of inflation of the airbag 15, and is equipped with an upper wall portion 18a and a lower wall portion 18b that are arranged opposite each other in the vertical direction, and a right wall portion 18d and a left wall portion 18c that are arranged opposite each other in the lateral direction. In the airbag 15 according to the embodiment, a section of the peripheral wall portion 18 that is located on the front end side upon the completion of inflation of the airbag serves as the attachment portion 20 for attaching the airbag 15 to the case 12. In the case of the embodiment, the width dimension of the attachment portion 20 in the lateral direction upon the completion of inflation of the airbag is set larger than the width dimension of the case 12 in the lateral direction (see FIG. 8). A gas inflow port 21 that is formed in such a manner as to open substantially in the shape of a circle such that inflation gas can flow thereinto, and a plurality of (four in the case of the embodiment) attachment holes 22 for inserting bolts (not shown) of the retainer 9 therethrough on a peripheral edge of the gas inflow port 21 are formed on a lower surface side (the lower wall portion 18b side) of this attachment portion 20 upon the completion of inflation of the airbag. The peripheral edge of the gas inflow port 21 is configured to be attached to the case 12. In the case of the embodiment, the gas inflow port 21 is arranged at a position that is slightly deviated rightward from a lateral center of the attachment portion 20. The airbag 15 is attached to the case 12 and mounted in the vehicle V such that a center of this gas inflow port 21 serves as an attachment center C (see FIG. 4) and that this attachment center C substantially coincides with a center of the front passenger seat PS in the lateral direction (see FIG. 8). Besides, vent holes 24 for discharging surplus inflation gas that has flowed in are formed through the right wall portion 18d and the left wall portion 18c of the peripheral wall portion 18 respectively.

Figure 4:
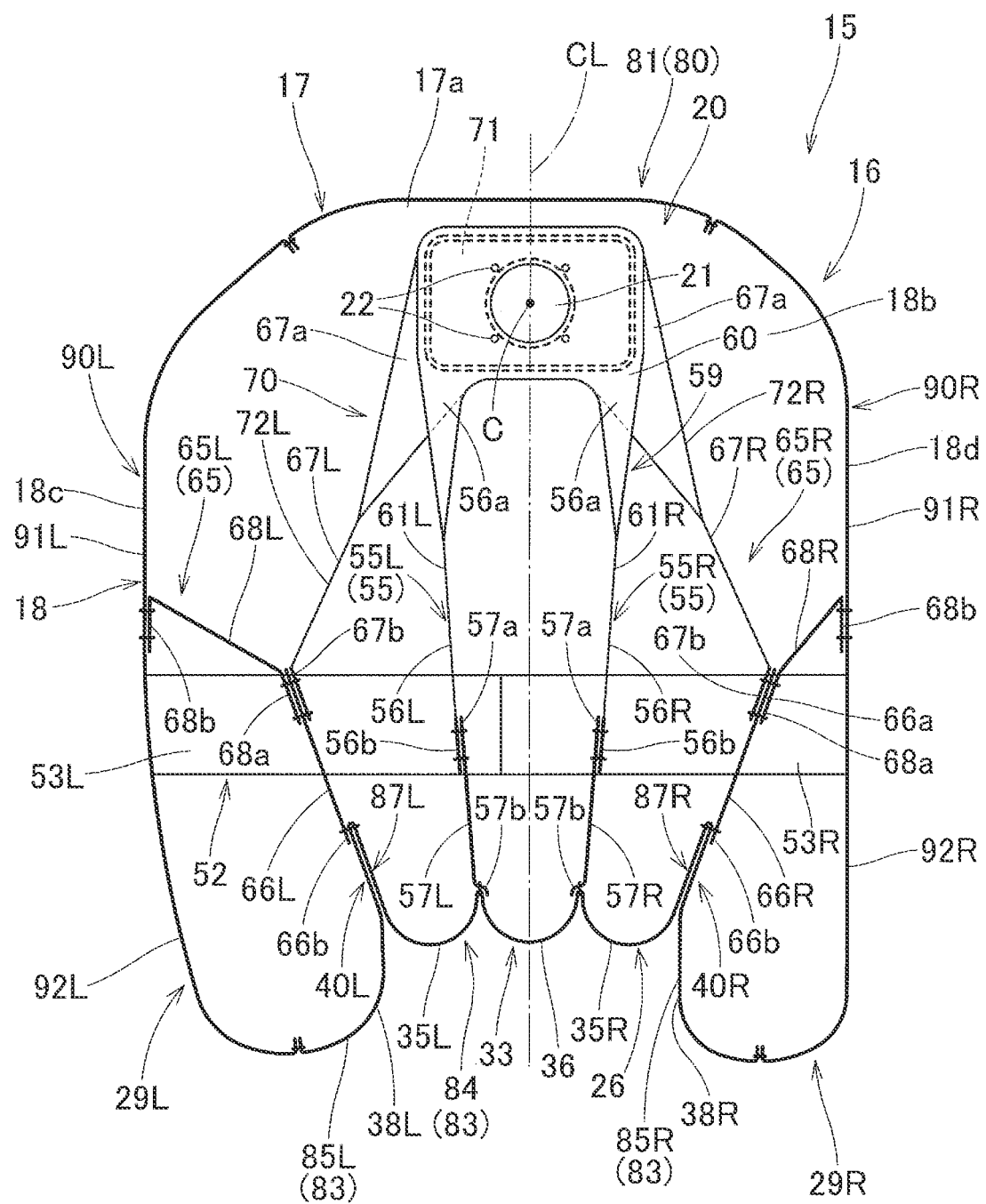
FIG. 4 is a schematic lateral sectional view of the airbag of FIG. 1.

In the case of the embodiment, the body inflation portion 17 is configured such that the attachment center C of the gas inflow port 21 is arranged at a position that is deviated slightly rightward from the lateral center of the attachment portion 20. The lateral width dimension of a region that is arranged on the left side (the driver seat DS side, the vehicle interior side) with respect to an attachment centerline CL (see FIGS. 4 and 8) passing through the attachment center C and extending along the longitudinal direction is made larger than the lateral width dimension of a region that is arranged on the right side (on a vehicle exterior side spaced apart from the driver seat DS) with respect to the attachment centerline CL, upon the completion of inflation of the airbag when the airbag is mounted in the vehicle. In the embodiment, as shown in FIGS. 4 and 8, the rear wall portion 26 (a frontal collision restraint surface 33 that will be described later) is configured such that a center thereof in the lateral direction substantially coincides with the attachment centerline CL. The body inflation portion 17 is configured as described above by setting the width dimension (thickness) of the left protruding inflation portion 29L in the lateral direction slightly larger than the width dimension (thickness) of the right protruding inflation portion 29R in the lateral direction.

The left protruding inflation portion 29L is formed at a left end-side section of the rear wall portion 26 on the driver seat DS side, and is arranged at a position located diagonally to the left of and in front of the passenger MP sitting in the front passenger seat PS (see FIG. 8). This left protruding inflation portion 29L is configured to cause inflation gas to flow thereinto via the body inflation portion 17, by being held, on the front end side thereof upon the completion of inflation of the airbag, in communication with the body inflation portion 17 (see FIGS. 4, 5, and 8). Upon the completion of inflation of the airbag, the contour of the left protruding inflation portion 29L substantially assumes the shape of a plate that is arranged such that the thickness direction thereof coincides with the lateral direction, and substantially assumes the shape of a trapezoid as viewed in the lateral direction. In concrete terms, the shape of the left protruding inflation portion 29L upon the completion of inflation of the airbag as viewed in the lateral direction is a trapezoid whose width is large on a front end 29c side, namely, the body inflation portion 17 side and decreases as the distance to a rear end 29d side shortens (see FIGS. 1 and 3). This left protruding inflation portion 29L is equipped with a right wall portion 29b and a left wall portion 29a that are arranged opposite each other in the lateral direction, upon the completion of inflation of the airbag. As shown in FIG. 4, the left wall portion 29a is configured to continue from the left wall portion 18c of the peripheral wall portion 18 of the body inflation portion 17. The outside dimension (the width dimension in the vertical direction and the width dimension in the longitudinal direction (the amount of protrusion from the rear wall portion 26)) of the left protruding inflation portion 29L is set as a dimension that allows a head MH of the passenger MP to be smoothly guided toward a left restraint recess portion 40L when the head of this passenger MP that moves diagonally forward is brought into contact with the right wall portion 29b (a left oblique collision restraint surface 38L) upon the completion of inflation of the airbag 15.

In the airbag 15 according to the embodiment, the right protruding inflation portion 29R, the left protruding inflation portion 29L, and the rear wall portion 26 of the body inflation portion 17 constitute a passenger protection portion 32 capable of protecting the passenger MP upon the completion of inflation of the airbag 15. In the case of the embodiment, the passenger protection portion 32 is configured to be equipped with the frontal collision restraint surface 33 that can protect the head MH of the passenger MP that moves forward in the event of a frontal collision of the vehicle V, two oblique collision restraint surfaces, namely, a right oblique collision restraint surface 38R and the left oblique collision restraint surface 38L that can protect the head MH of the passenger MP that moves diagonally forward in the event of an oblique collision or an offset collision of the vehicle V, and a right restraint recess portion 40R and the left restraint recess portion 40L that are formed between the right oblique collision restraint surface 38R and the frontal collision restraint surface 33 and between the left oblique collision restraint surface 38L and the frontal collision restraint surface 33 respectively.

The frontal collision restraint surface 33 is configured from a region above the rear wall portion 26, and is configured from a region that is arranged between the right protruding inflation portion 29R and the left protruding inflation portion 29L in the airbag 15 upon the completion of inflation thereof. This frontal collision restraint surface 33 is configured such that the width dimension thereof in the lateral direction allows the head MH of the passenger MP that moves forward in the event of a frontal collision to be protected without hindrance. Besides, in the embodiment, three protruding surfaces 35R, 35L, and 36 that are formed in such a manner as to protrude backward upon the completion of inflation of the airbag are juxtaposed in the lateral direction on the frontal collision restraint surface 33. More specifically, the protruding surfaces 35R, 35L, and 36 are formed in such a manner as to divide the region of the frontal collision restraint surface 33 into three areas in the lateral direction, and are configured, in the case of the embodiment, such that the amounts of backward protrusion thereof are approximately equal to one another. Moreover, irregularities are formed on these protruding surfaces 35R, 35L, and 36 inside the bag body 16, by the longitudinal tethers 55R and 55L that are arranged in such a manner as to couple the front end 17a side of the airbag 15 (the body inflation portion 17) and the frontal collision restraint surface 33 to each other. The width dimension of the protruding surfaces 35R, 35L, and 36 in the vertical direction is approximately equal to the width dimension of the right restraint recess portion 40R and the left restraint recess portion 40L in the vertical direction (see FIGS. 2 and 3). A width dimension L1 (see FIG. 5) of the protruding surface 35L (35R) in the lateral direction upon the completion of inflation of the airbag 15 is preferably set equal to about 50 to 100 mm, and is set equal to 70 mm in the embodiment. Besides, in the embodiment, a width dimension L2 of the protruding surface 36 in the lateral direction is set approximately equal to the width dimension L1 of the protruding surface 35L (35R) in the lateral direction.

Figure 5:
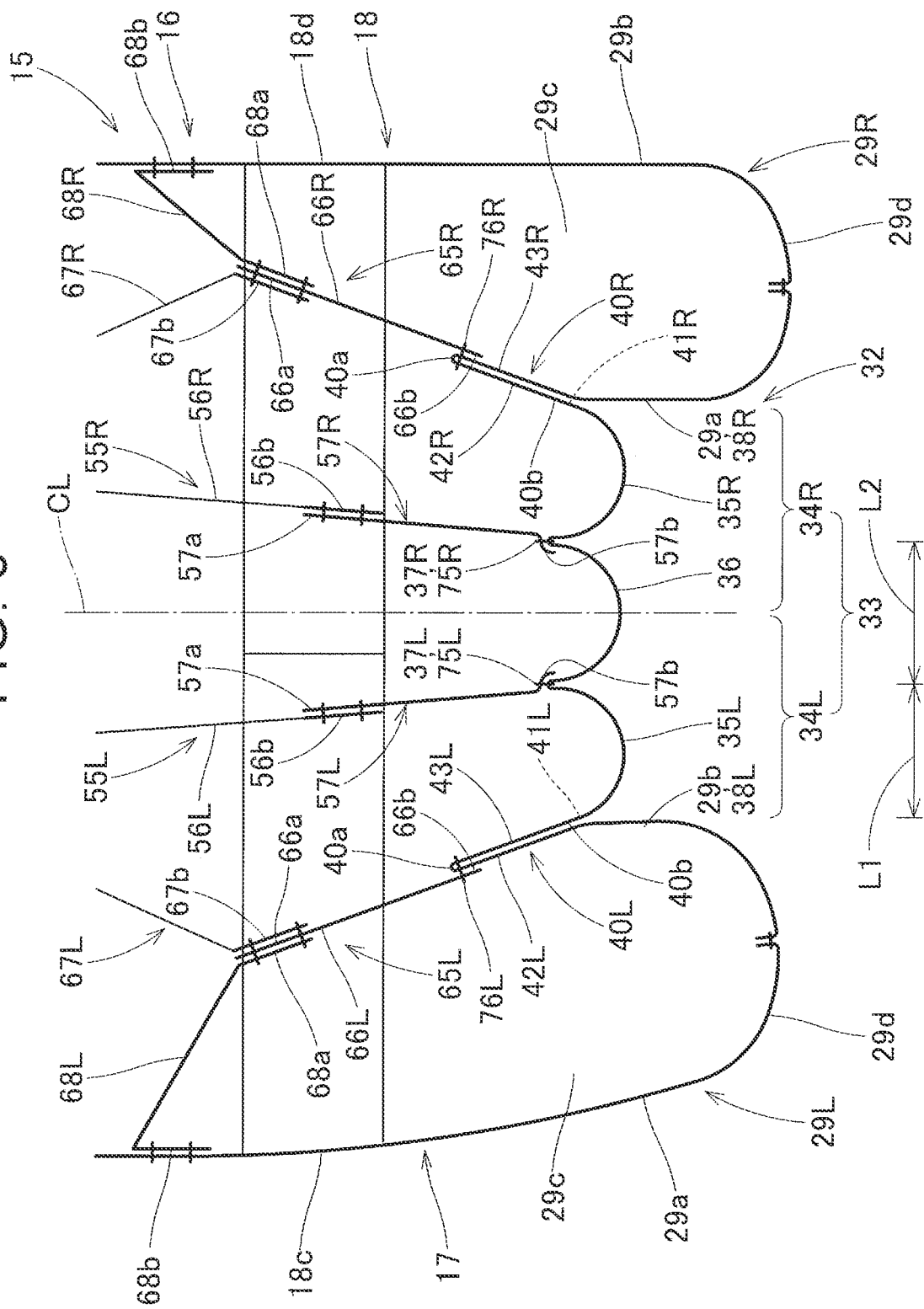
FIG. 5 is a partially enlarged schematic lateral sectional view showing a region of a passenger protection portion, in the airbag of FIG. 1.

Moreover, the airbag 15 according to the embodiment is configured such that two areas, namely, the left protruding surface 35L and a left-half region of the central protruding surface 36 are arranged in a left region 34L (a recess portion-side region) that is located on the left restraint recess portion 40L side (the left side with respect to the attachment centerline CL) with respect to the center of the frontal collision restraint surface 33 in the lateral direction, as shown in FIGS. 4 and 5. More specifically, in the embodiment, the left protruding surface 35L is configured from a region ranging from a boundary section with the left restraint recess portion 40L to a link section 75L (a boundary section 37L) with which a rear end of the left longitudinal tether is linked, in the left region 34L of the frontal collision restraint surface 33 (the rear wall portion 26). The central protruding surface 36 is configured from a region on the right side of the link section 75L (a region between a link section 75R and the link section 75L (between a boundary section 37R and the boundary section 37L) when the frontal collision restraint surface 33 is viewed as a whole). Besides, in the airbag 15 according to the embodiment, a lower region of the rear wall portion 26 mainly receives a chest of the passenger MP when the head MH of the passenger MP that moves forward is restrained by the passenger protection portion in the event of a frontal collision, an oblique collision, or an offset collision.

The left oblique collision restraint surface 38L that is arranged on the left side (the vehicle interior side), namely, on the driver seat DS side is configured from the right wall portion 29b that is arranged substantially along the longitudinal direction on the frontal collision restraint surface 33 (the rear wall portion 26) side at the left protruding inflation portion 29L. The right oblique collision restraint surface 38R that is arranged on the right side (the vehicle exterior side), namely, on a side spaced apart from the driver seat DS is configured from the left wall portion 29a that is arranged substantially along the longitudinal direction on the frontal collision restraint surface 33 (the rear wall portion 26) side at the right protruding inflation portion 29R. That is, the right oblique collision restraint surface 38R and the left oblique collision restraint surface 38L are formed in such a manner as to protrude further backward than the frontal collision restraint surface 33 upon the completion of inflation of the airbag 15 (see FIGS. 4 and 5).

The left restraint recess portion 40L that is formed between the frontal collision restraint surface 33 and the left oblique collision restraint surface 38L is designed to advance and restrain the head MH of the passenger MP that moves diagonally leftward and forward. In the case of the embodiment, the left restraint recess portion 40L is formed substantially along the vertical direction in a boundary section between a right region of the left protruding inflation portion 29L and the rear wall portion 26 of the body inflation portion 17 (see FIGS. 3 to 5). In the case of the embodiment, the left restraint recess portion 40L is formed from a region of the bag body 16 that forms the passenger protection portion 32 (a recess portion constituting portion 87L), by the left recess portion tether 65L that will be described later. The left restraint recess portion 40L is formed in such a manner as to be recessed substantially in the shape of a pocket with a rear end 40b side open, upon the completion of inflation of the bag body 16, and is configured to be arranged with a right wall 43L and a left wall 42L that are arranged opposite each other in press-contact with each other, and with an opening 41L on the rear end 40b side restrained from opening. Besides, the left restraint recess portion 40L is arranged inclined with respect to the longitudinal direction, such that a tip of the recess (a front end 40a) is directed leftward (toward the vehicle interior), upon the completion of inflation of the bag body 16 (see FIGS. 4 and 5). The length dimension of this left restraint recess portion 40L in the vertical direction (an opening width dimension of the opening 41L in the vicinity of the rear end 40b) is set as a dimension that allows the head MH of the passenger MP to smoothly enter the left restraint recess portion 40L. Besides, the width dimension (the depth) of the left restraint recess portion 40L in the longitudinal direction is set as a dimension that allows a front region of the head MH of the passenger MP to enter the left restraint recess portion 40L.

As shown in FIGS. 1 to 5, the tethers 50, 52, 55R, 55L, 65R, and 65L are arranged in the bag body 16, as shown in FIGS. 1 to 5. In concrete terms, the lateral tethers 50 and 52, the longitudinal tethers 55R and 55L, and the recess portion tethers 65R and 65L are arranged in a region of the body inflation portion 17.

Figure 7:
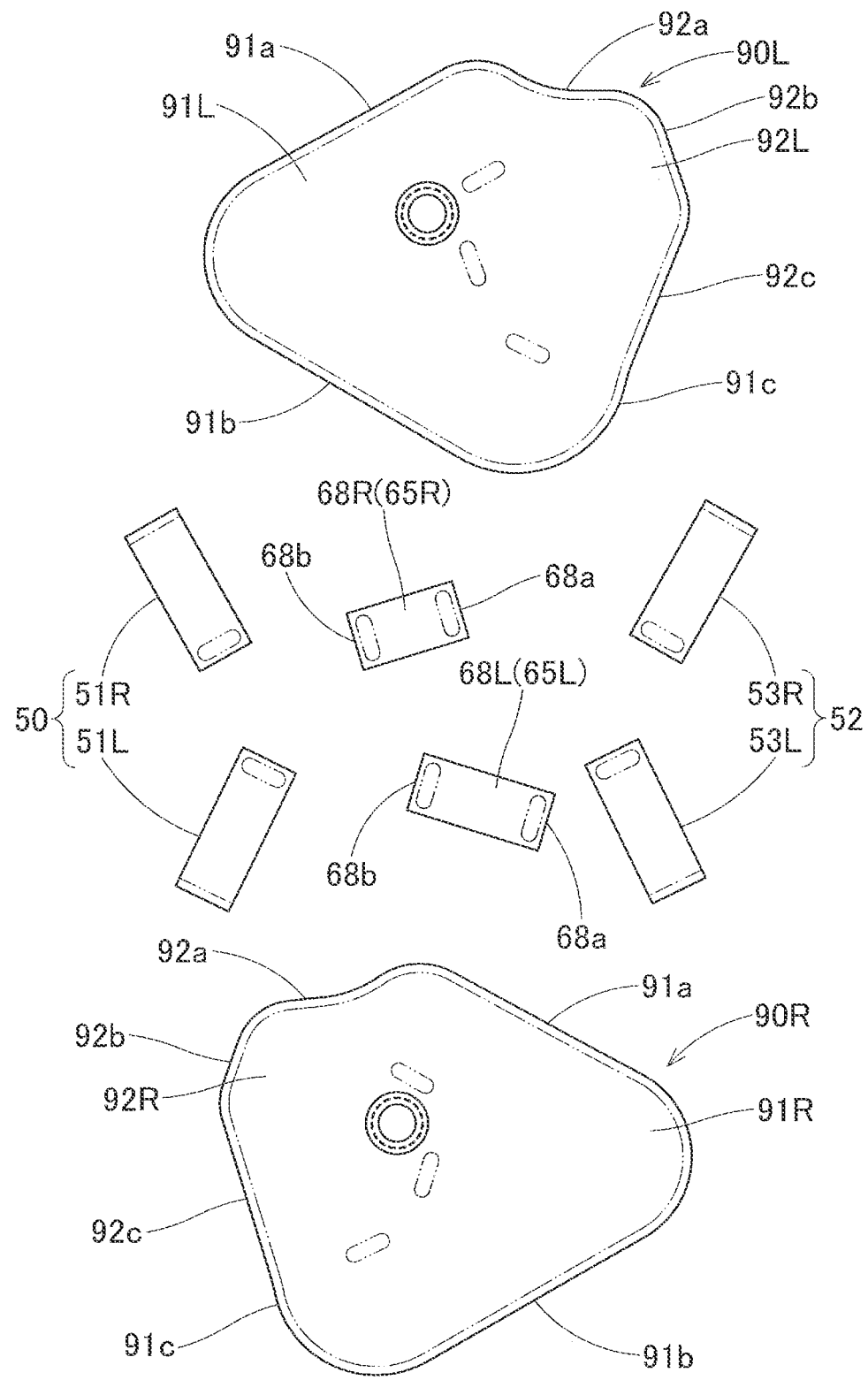
FIG. 7 is a plan view showing the rest of the ground fabric constituting the airbag of FIG. 1.

The lateral tethers 50 and 52 are arranged substantially along the lateral direction in such a manner as to couple the right wall portion 18d and the left wall portion 18c of the body inflation portion 17 to each other, upon the completion of inflation of the bag body 16. In the case of the embodiment, as shown in FIG. 2, the lateral tethers 50 and 52 are disposed at two locations, namely, in regions above and below the longitudinal tethers 55R and 55L. In the case of the embodiment, each of the lateral tethers 50 and 52 is arranged in such a manner as to assume the shape of a band substantially extending along the lateral direction and incline the width direction thereof with respect to the horizontal direction upon the completion of inflation of the bag body 16 (see FIGS. 2 and 3). As shown in FIG. 7, each of the lateral tethers 50 and 52 is configured by linking edge portions of two corresponding ones of tether ground fabrics 51R and 51L or 53R and 53L, which are juxtaposed in the lateral direction, with each other. These lateral tethers 50 and 52 are arranged to define the spacing distance between the right wall portion 18d and the left wall portion 18c of the body inflation portion 17 upon the completion of inflation of the airbag.

The longitudinal tether 55 is equipped with a right longitudinal tether 55R that couples the front end 17a side of the airbag 15 and the right region 34R of the frontal collision restraint surface 33 to each other upon the completion of inflation of the airbag, and a left longitudinal tether 55L that couples the front end 17a side of the airbag 15 (the body inflation portion 17) and the left region 34L of the frontal collision restraint surface 33 to each other upon the completion of inflation of the airbag. As shown in FIGS. 4 and 5, the right longitudinal tether 55R and the left longitudinal tether 55L couple the vicinity of the lateral center of the rear wall portion 26 (the frontal collision restraint surface 33) and a peripheral section of the gas inflow port 21 (the front end 17a side of the airbag 15 (the body inflation portion 17)) to each other upon the completion of inflation of the airbag 15, and are arranged on the frontal collision restraint surface upon the completion of inflation of the airbag, in order to form the three protruding surfaces 35R, 35L, and 36. Besides, this right longitudinal tether 55R and this left longitudinal tether 55L are arranged to restrain the frontal collision restraint surface 33 from protruding excessively backward in early phase of inflation of the airbag 15, and restrain the frontal collision restraint surface 33 from moving backward upon the completion of inflation of the airbag. Each of the right longitudinal tether 55R and the left longitudinal tether 55L is configured such that the contour thereof is substantially bilaterally symmetric upon the completion of inflation of the airbag 15. In the embodiment, the left longitudinal tether 55L will be cited as an example and described in detail.

The left longitudinal tether 55L couples the front end 17a side of the airbag 15 (the body inflation portion 17) and the left region 34L of the frontal collision restraint surface 33 (the recess portion region that is located on the left restraint recess portion 40L side with respect to the center of the frontal collision restraint surface 33 in the lateral direction) to each other. As shown in FIGS. 4 and 5, the left longitudinal tether 55L is configured to couple a front section 56L extending from the peripheral edge of the gas inflow port 21 and a rear section 57L extending from the rear wall portion 26 side (the frontal collision restraint surface 33 side) to each other. The front section 56L, whose contour assumes the shape of a band, is linked at a front end 56a thereof with the peripheral edge (more specifically, a left edge side) of the gas inflow port 21 of the bag body 16, and is linked at a rear end 56b thereof with a front end 57a of the rear section 57L. In the embodiment, the front section 56L as well as the front section 56R of the right longitudinal tether 55R is configured from a tether ground fabric 59 shown in FIG. 6. The tether ground fabric 59 is configured to be equipped with a coupling portion 60 that is coupled to the peripheral edge of the gas inflow port 21 in common, and two band-shaped portions 61R and 61L that extend from the coupling portion 60 in such a manner as to incline with respect to the longitudinal direction. When the tether ground fabric 59 is flatly deployed, the contour thereof is substantially bilaterally symmetric. An opening (to which no reference symbol is assigned) corresponding to the gas inflow port 21 and an attachment hole 22 is formed through the coupling portion 60. Moreover, these band-shaped portions 61R and 61L constitute the front sections 56R and 56L of the right longitudinal tether 55R and the left longitudinal tether 55L respectively.

The rear section 57L substantially assumes the shape of a vertically wide band, and is configured such that a rear end 57b thereof is linked, substantially over an entire vertical range thereof, with the left region 34L of the frontal collision restraint surface 33 (the rear wall portion 26). In concrete terms, the rear section 57L is linked with a region that spreads over a length of about ⅓ from a left end side of the frontal collision restraint surface 33 (the rear wall portion 26) when the frontal collision restraint surface 33 (the rear wall portion 26) is viewed from behind. More specifically, the contour of this rear section 57L substantially assumes the shape of a trapezoid that is vertically wide on the rear end 57b side and that is formed such that a front section thereof decreases in width as the distance to the front end 57a side shortens. The contour of this rear section 57L is substantially the same as the contour of a later-described rear section 66L of the left recess portion tether 65L (see FIG. 6). Moreover, the link section 75L that links a rear end 66b of this rear section 66L with a central panel 80 that will be described later constitutes the boundary section 37L (the tip of the recess) between the left protruding surface 35L and the central protruding surface 36, upon the completion of inflation of the bag body 16 (see FIGS. 2, 4, and 5). That is, in the embodiment, the vertical width dimension of the rear end 66b of the rear section 66L defines the length dimension of the protruding surfaces 35L and 36 formed on the frontal collision restraint surface 33 in the vertical direction, upon the completion of inflation of the airbag 15. Besides, the vertical position of this rear section 66L substantially coincides with that of a rear section 66R constituting the left recess portion tether 65L, when the airbag 15 upon the completion of inflation thereof is viewed in the lateral direction (see FIG. 2).

The recess portion tether 65 is equipped with the right recess portion tether 65R that forms the shape of the recess of the right restraint recess portion 40R, and the left recess portion tether 65L that forms the shape of the recess of the left restraint recess portion 40L. The right recess portion tether 65R and the left recess portion tether 65L form the right restraint recess portion 40R and the left restraint recess portion 40L respectively upon the completion of inflation of the airbag 15, and are arranged to allow the right restraint recess portion 40R and the left restraint recess portion 40L to be arranged inclined with respect to the longitudinal direction such that the tip (the front end 40a) of the recess is directed diagonally forward, namely, outward in the lateral direction. The right recess portion tether 65R and the left recess portion tether 65L are configured such that the contours thereof are substantially bilaterally symmetric upon the completion of inflation of the airbag 15, except the length dimensions of front outer sections 68R and 68L and the positions where the front outer sections 68R and 68L are linked with the right wall portion 18d and the left wall portion 18c respectively. In the embodiment, the left recess portion tether 65L will be cited as an example and described in detail.

The left recess portion tether 65L is configured to be equipped with the rear section 66L that extends from the tip (the front end 40a) side of the recess of the left restraint recess portion 40L, and a front inner section 67L and a front outer section 68L that are arranged in such a manner as to laterally branch off from a front end 66a side of the rear section 66L, in the airbag 15 upon the completion of inflation thereof.

As shown in FIG. 3, the rear section 66L substantially assumes the shape of a vertically wide band, and is configured such that the rear end 66b side thereof is linked, substantially over the entire vertical range thereof, with the vicinity of a boundary section between the right wall portion 29b of the left protruding inflation portion 29L of the bag body 16 and the rear wall portion 26 of the body inflation portion 17. The contour of this rear section 66L is the same as the contour of the rear section 57L of the left longitudinal tether 55L. The rear section 66L substantially assumes the shape of a trapezoid that is vertically wide on the rear end 66b side thereof and whose front section decreases in width as the distance to the front end 66a side shortens. Moreover, a link section 76L that links the rear end 66b of this rear section 66L with the central panel 80 that will be described later constitutes the tip (the front end 40a) of the recess of the left restraint recess portion 40L, upon the completion of inflation of the bag body 16 (see FIGS. 3 to 5). That is, the vertical width dimension of the rear end 66b of the rear section 66L defines the length dimension of the left restraint recess portion 40L in the vertical direction, upon the completion of inflation of the airbag 15.

The contour of the front inner section 67L assumes the shape of a band. The front inner section 67L is linked at a front end 67a thereof with the peripheral edge (more specifically, the left edge side) of the gas inflow port 21 of the bag body 16, and is linked at a rear end 67b thereof with the front end 66a of the rear section 66L. In the embodiment, the front inner section 67L as well as the front inner section 67R of the right recess portion tether 65R is configured from a tether ground fabric 70 shown in FIG. 6. The tether ground fabric 70 is configured to be equipped with a coupling portion 71 that is coupled to the peripheral edge of the gas inflow port 21 in common, and two band-shaped portions 72R and 72L that extend from the coupling portion 71 in such a manner as to incline with respect to the longitudinal direction. When the tether ground fabric 70 is flatly deployed, the contour thereof is substantially bilaterally symmetric. An opening (to which no reference symbol is assigned) corresponding to the gas inflow port 21 and the attachment hole 22 is formed through the coupling portion 71. Moreover, these band-shaped portions 72R and 72L constitute the front inner sections 67R and 67L of the right recess portion tether 65R and the left recess portion tether 65L respectively. The contour of the front outer section 68L assumes the shape of a band. The front outer section 68L is linked at a root portion 68a thereof with the front end 66a of the rear section 66, and is linked at a tip 68b thereof with the left wall portion 18c of the bag body 16.

In the embodiment, the rear section 66L of the left recess portion tether 65L is configured to be arranged inclined with respect to the longitudinal direction, in such a manner as to continue from the left restraint recess portion 40L that is arranged inclined with respect to the longitudinal direction such that the tip (the front end 40a) is directed diagonally leftward and forward, upon the completion of inflation of the airbag 15 (see FIGS. 4 and 5). Moreover, the front inner section 67L and the front outer section 68L extend in such a manner as to laterally branch off from the front end 66a of this rear section 66L that is arranged in an inclined posture. By causing the rear section 66L, the front inner section 67L, and the front outer section 68L to cooperate with one another, this left recess portion tether 65L arranges the left restraint recess portion 40L in an inclined posture with respect to the longitudinal direction such that the tip (the front end 40a) of the recess is directed leftward (outward in the lateral direction) while holding the right wall 43L and the left wall 42L, which are arranged opposite each other, in press-contact with each other, as shown in FIGS. 4 and 5. In concrete terms, upon the completion of inflation of the airbag 15, the left restraint recess portion 40L is arranged in such a manner as to be recessed substantially along the traveling direction of the head MH of the passenger MP that moves diagonally leftward and forward, by being towed by the left recess portion tether 65L (see FIGS. 4, 5, and 8).

The bag body 16 is configured in the shape of a bag by linking peripheral edges of a ground fabric of a predetermined shape with one another. In the case of the embodiment, as shown in FIGS. 6 and 7, the bag body 16 is configured from three ground fabrics, namely, the central panel 80 that constitutes a central region of the bag body 16, a right panel 90R that is arranged on the right side of the bag body 16 upon the completion of inflation of the airbag, and a left panel 90L that is arranged on the left side of the bag body 16 upon the completion of inflation of the airbag.

Figure 6:
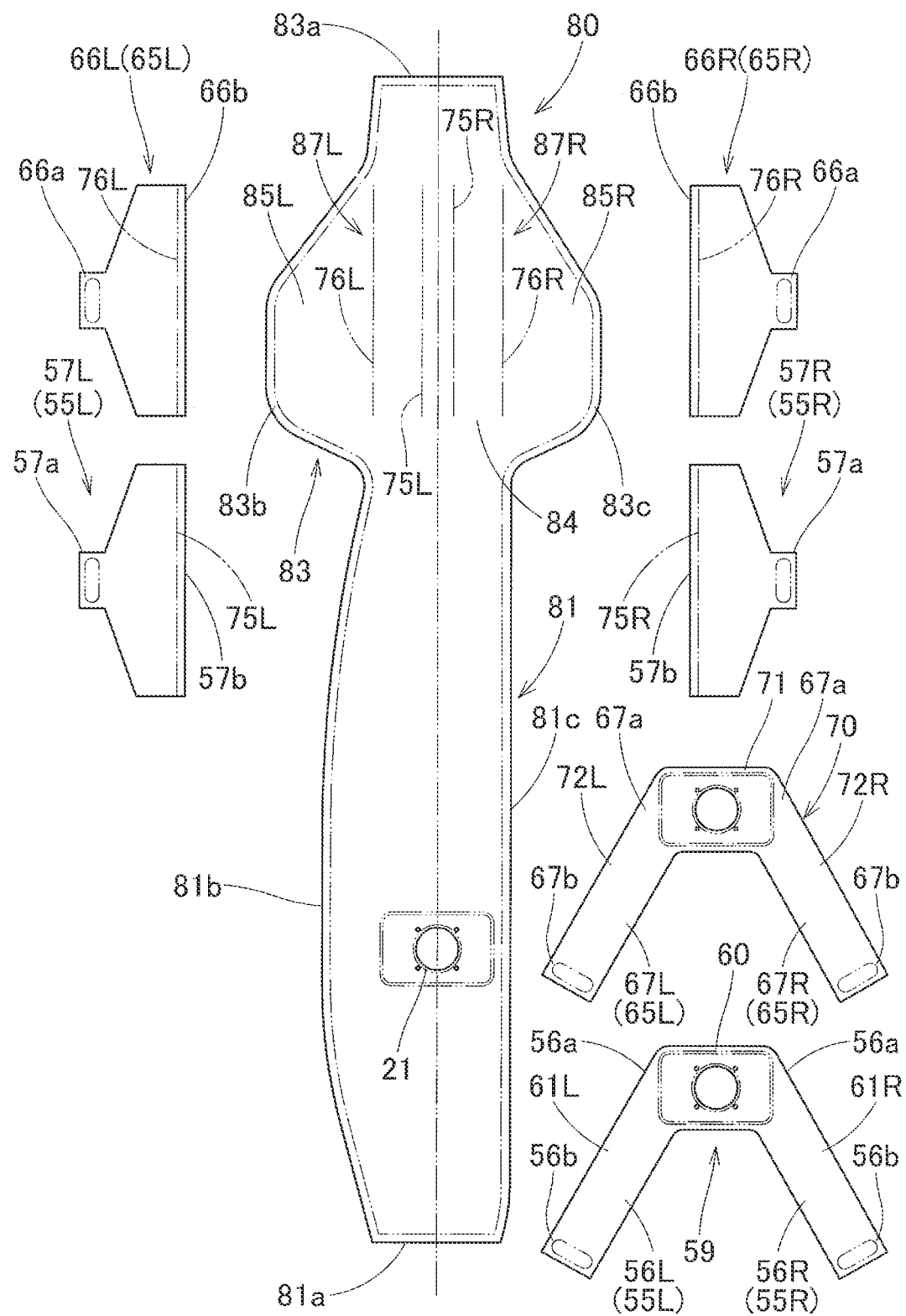
FIG. 6 is a plan view showing a ground fabric constituting the airbag of FIG. 1.

As shown in FIG. 6, the central panel 80 substantially assumes the shape of a band whose length direction substantially extends along the longitudinal direction, in such a manner as to couple a peripheral wall constituting portion 81 that constitutes a part from the upper wall portion 18a of the peripheral wall portion 18 to the lower wall portion 18b thereof, and a passenger protection portion constituting portion 83 that constitutes the passenger protection portion 32 (a part from the rear wall portion 26 to the right wall portion 29b of the left protruding inflation portion 29L and the left wall portion 29a of the right protruding inflation portion 29R) in series to each other. In the case of the embodiment, the central panel 80 assumes the shape of a band in such a manner as to couple an upper end of the passenger protection portion constituting portion 83 and a rear end of the peripheral wall constituting portion 81 to each other. In the case of the embodiment, the peripheral wall constituting portion 81 is bilaterally asymmetrically configured such that a left edge 81b side thereof bulges out leftward.

The passenger protection portion constituting portion 83 is configured to be equipped with a central portion 84 that constitutes the rear wall portion 26 (the frontal collision restraint surface 33), a right portion 85R that is formed in such a manner as to protrude rightward from the central portion 84 and that constitutes the left wall portion 29a of the right protruding inflation portion 29R (the right oblique collision restraint surface 38R), and a left portion 85L that is formed in such a manner as to protrude leftward from the central portion 84 and that constitutes the right wall portion 29b of the left protruding inflation portion 29L (the left oblique collision restraint surface 38L). Each of the right portion 85R and the left portion 85L is configured such that the contour thereof substantially assumes the shape of a trapezoid. In the embodiment, the rear end 66b of the rear section 66R of the right recess portion tether 65R and the rear end 66b of the rear section 66L of the left recess portion tether 65L are configured to be linked with each other, such that link sections 76R and 76L that extend along the vertical direction are provided in the vicinity of the boundary section between the right portion 85R and the central portion 84 and in the vicinity of the boundary section between the left portion 85L and the central portion 84, respectively (see FIG. 6). Moreover, the vicinity of the boundary section between the right portion 85R and the central portion 84 and the vicinity of the boundary section between the left portion 85L and the central portion 84 serve as a recess portion constituting portion 87R and the recess portion constituting portion 87L respectively, and constitute the right restraint recess portion 40R and the left restraint recess portion 40L by being towed by the right recess portion tether 65R and the left recess portion tether 65L respectively, upon the completion of inflation of the bag body 16. Besides, in the configuration according to the embodiment, as shown in FIG. 6, the rear end 57b of the rear section 57R of the right longitudinal tether 55R and the rear end 57b of the rear section 57L of the left longitudinal tether 55L are linked with regions of the central portion 84 that are located laterally inside the link sections 76R and 76L respectively, such that the link sections 75R and 75L that extend along the vertical direction are provided respectively.

The contour of each of the right panel 90R and the left panel 90L is substantially bilaterally symmetric. In the embodiment, the left panel 90L will be cited as an example and described in detail. The left panel 90L constitutes a section from the left wall portion 18*c* of the body inflation portion 17 upon the completion of inflation of the airbag to the left wall portion 29*a* of the left protruding inflation portion 29L, and is configured by coupling a substantially trapezoidal protrusion portion 92L that constitutes the left wall portion 29*a* of the left protruding inflation portion 29L to a rear end side of a substantially triangular body portion 91L that constitutes the region of the left wall portion 18*c* of the body inflation portion 17 as shown in FIG. 7. This protrusion portion 92L is configured such that the contour thereof substantially coincides with that of the left portion 85L of the passenger protection portion constituting portion 83 on the central panel 80.

In the embodiment, the central panel 80, the right panel 90R, and the left panel 90L that constitute the bag body 16, the tether ground fabrics 51R, 51L, 53R, and 53L that constitute the right and left tethers 52 and 50 respectively, the rear sections 57R and 57L that constitute the right longitudinal tether 55R and the left longitudinal tether 55L respectively, the tether ground fabric 59, the rear sections 66R and 66L that constitute the right recess portion tether 65R and the left recess portion tether 65L respectively, the front outer sections 68R and 68L, and the tether ground fabric 70 are each formed of a flexible fabric cloth made of polyester yarn, polyamide yarn, or the like.

Moreover, as shown in FIGS. 6 and 7, the bag body 16 according to the embodiment is made to assume the shape of a bag, by sewing (linking) corresponding edge portions of the central panel 80, the right panel 90R, and the left panel 90L with one another through the use of suture thread. In concrete terms, the left edge 81*b* of the peripheral wall constituting portion 81 of the central panel 80 is linked with a part from an upper edge 91*a* of the body portion 91L of the left panel 90L to a lower edge 91*b* thereof. A right edge 81*c* of the peripheral wall constituting portion 81 is linked with a part from an upper edge 91*a* of a body portion 91R of the right panel 90R to a lower edge 91*b* thereof. A rear edge 81*a* of the peripheral wall constituting portion 81 is linked with a lower edge 83*a* of the passenger protection portion constituting portion 83 on the central panel 80. A left edge 83*b* of the passenger protection portion constituting portion 83 is linked with a rear edge 91*c* of the body portion 91L of the left panel 90L and upper edges 92*a*, 92*b*, and 92*c* of the protrusion portion 92L. A right edge 83*c* of the passenger protection portion constituting portion 83 is linked with a rear edge 91*c* of the body portion 91R of the right panel 90R and upper edges 92*a*, 92*b*, and 92*c* of a protrusion portion 92R.

The airbag device M for the front passenger seat according to this embodiment can be mounted in the vehicle V if the airbag 15 in which the retainer 9 is accommodated is folded in such a manner as to be accommodatable in the case 12 and accommodated into the case 12 with the periphery of the airbag 15 wrapped by a breakable wrapping sheet (not shown), the inflator 8 is coupled to the case 12 together with the peripheral edge of the gas inflow port 21 of the airbag 15 through the use of the retainer 9, and the case 12 in which the folded airbag 15 and the inflator 8 are accommodated and held is then coupled to an airbag cover (not shown) formed in an instrumental panel that is mounted in the vehicle V.

With the airbag device M for the front passenger seat according to the embodiment mounted in the vehicle V, the inflator 8 operates in the event of a frontal collision, an oblique collision, or an offset collision of the vehicle V.

Then, the airbag 15 inflates by causing inflation gas to flow thereinto, and completes its inflation as shown in FIG. 8 while protruding from the case 12.

Figure 9:
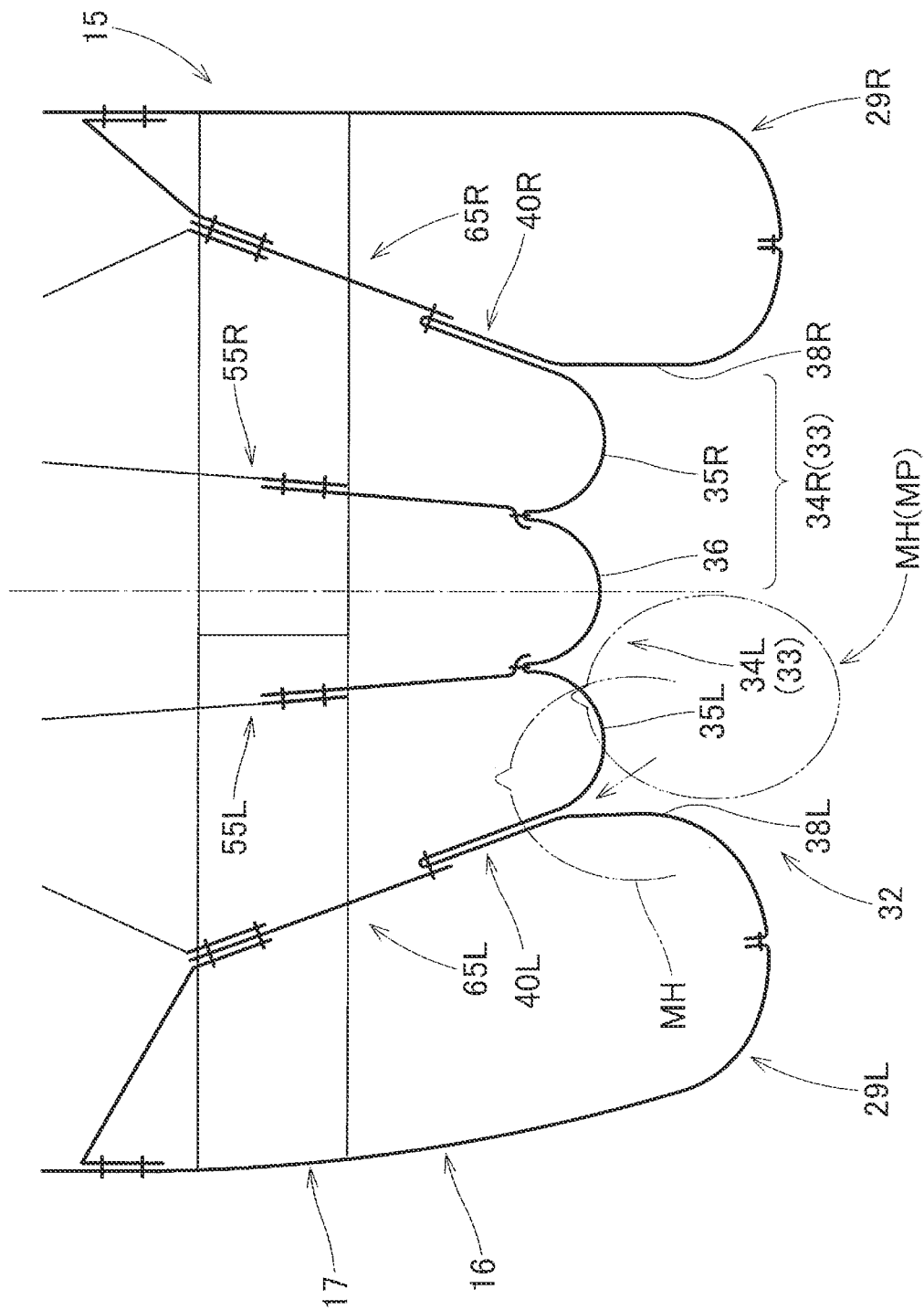
FIG. 9 is a schematic partially enlarged lateral sectional view showing a state where a head of a passenger is received, upon the completion of inflation of the airbag of FIG. 1.

Moreover, in the airbag device M for the front passenger seat according to the embodiment, the left region thereof, namely, the region thereof on the driver seat DS side will be cited as an example and described. The frontal collision restraint surface 33 is configured such that the two left protruding surfaces 35L and the central protruding surface 36 are juxtaposed in the lateral direction. The left longitudinal tether 55L that forms these two left protruding surfaces 35L and the central protruding surface 36 is configured to be coupled to the left region 34L as the recess portion-side region that is located on the left restraint recess portion 40L with respect to the center (the attachment centerline CL) of the frontal collision restraint surface 33 in the lateral direction. The curvature of the left protruding surface 35L that is formed adjacent to the left restraint recess portion 40L can be made larger than in a conventional case where a single protrusion portion is disposed in a region between a center in the lateral direction and a restraint recess portion (the outer protrusion portion). Therefore, even when the head MH of the passenger MP more or less deviates toward the center side in the lateral direction and comes into contact with the recess portion-side region 34L of the frontal collision restraint surface 33 in moving diagonally leftward and forward in the event of an oblique collision or an offset collision of the vehicle V, there is established an aspect in which the head MH of the passenger MP comes into contact only with the left protruding surface 35L that is formed adjacent to the left restraint recess portion 40L, as shown in FIG. 9. Moreover, this left protruding surface 35L is formed in an area with a small lateral width dimension between the left restraint recess portion 40L and the left longitudinal tether 55L that is coupled to the frontal collision restraint surface 33 at a position that is deviated toward the left restraint recess portion 40L side from the center of the frontal collision restraint surface 33 in the lateral direction. Thus, the left protruding surface 35L can be restrained from coming into contact with the head MH over a wide area, and the head MH is unlikely to be rotated reversely to the moving direction thereof, and can be immediately caused to smoothly enter the left restraint recess portion 40L after coming into contact with the left protruding surface 35L. As a result, the head MH of the passenger MP can be adequately protected by being caused to enter the left restraint recess portion 40L.

Accordingly, the airbag device M for the front passenger seat according to the embodiment can stably protect the head MH of the passenger MP that moves diagonally forward, even when the head MH of the passenger MP is received at a position deviated in the lateral direction.

Besides, in the airbag device M for the front passenger seat according to the embodiment, the left oblique collision restraint surface 38L is formed in such a manner as to protrude further backward than the frontal collision restraint surface 33. Thus, even in the case where the head MH of the passenger MP deviates toward the left oblique collision restraint surface 38L side (outward in the lateral direction) in moving diagonally leftward and forward, the head MH of the passenger MP can be received by the left oblique collision restraint surface 38L that is arranged in such a manner as to extend backward from the frontal collision restraint surface 33 and then guided toward the left restraint recess portion 40L side by this left oblique collision restraint surface 38L. Thus, in the event of an oblique collision or an offset collision, the head MH of the passenger MP that moves diagonally leftward and forward can be more stably received by the left restraint recess portion 40L. Incidentally, when this point is not taken into account, it is appropriate to use an airbag having a passenger protection portion that is configured such that no protruding inflation portion is arranged and that oblique collision restraint surfaces are arranged substantially flush with a frontal collision restraint surface laterally outward of the frontal collision restraint surface in such a manner as to sandwich restraint recess portions therebetween respectively.

Figure 10:
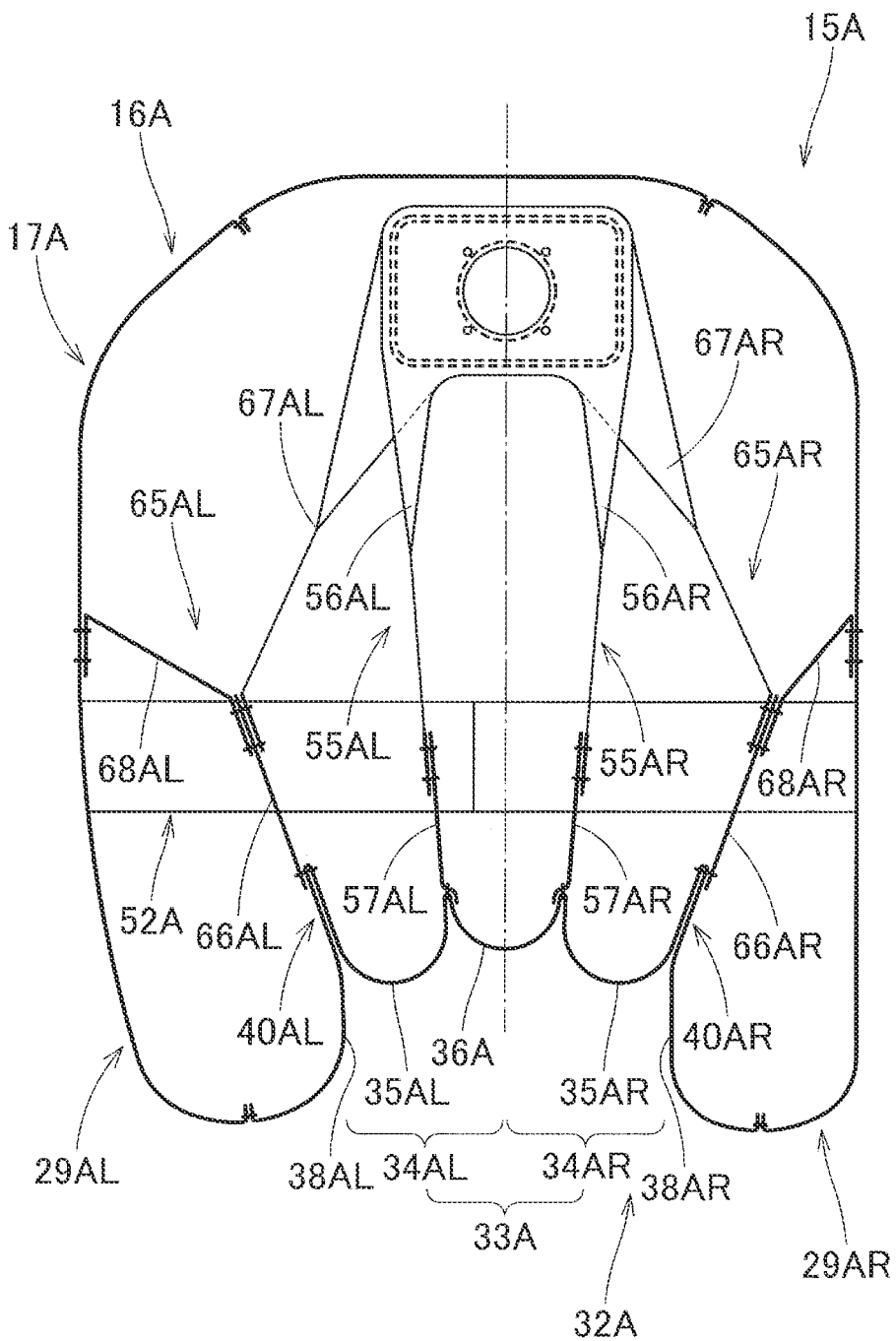
FIG. 10 is a schematic lateral sectional view showing a state where an airbag according to another one of the embodiments of the disclosure is inflated alone.
Figure 11:
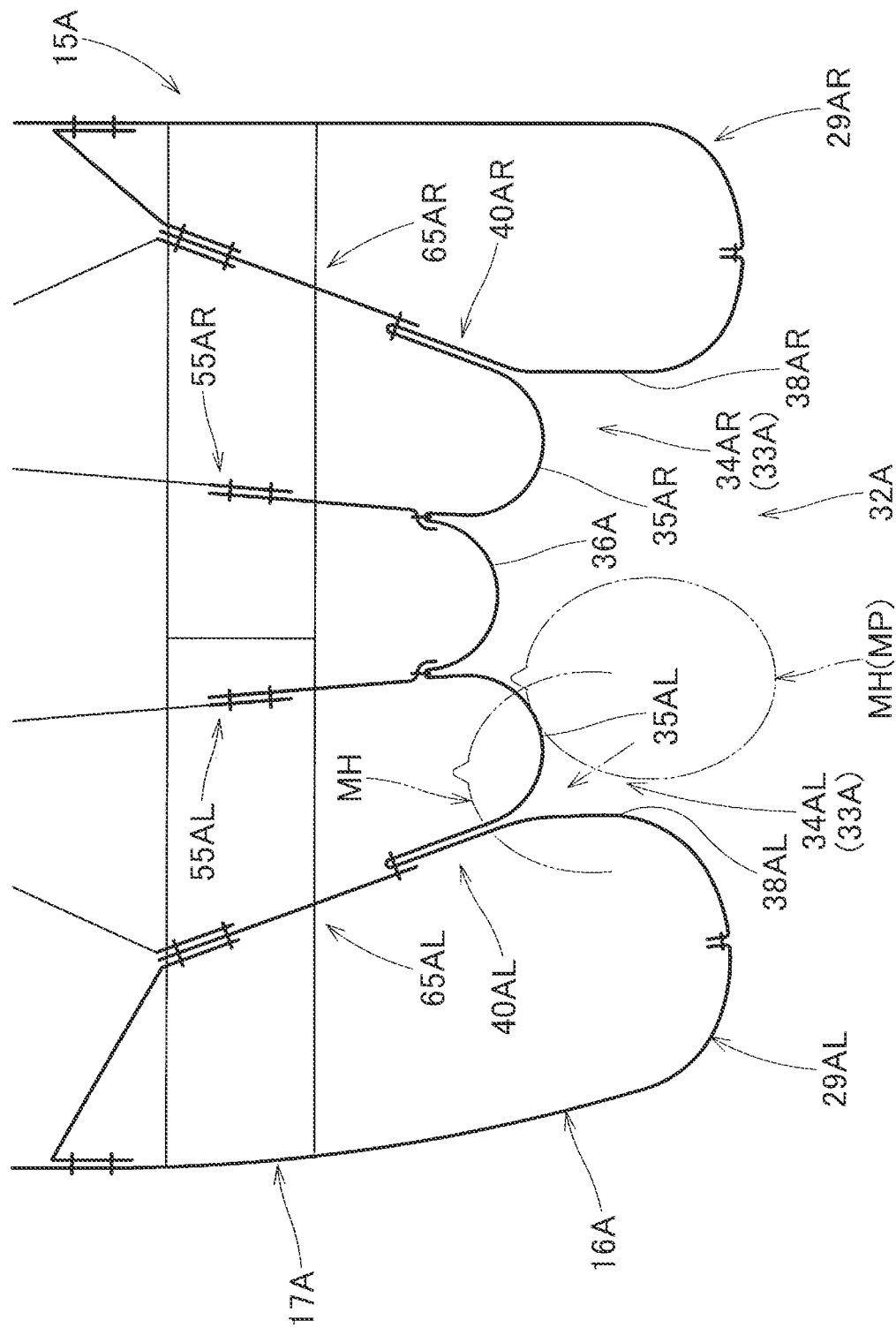
FIG. 11 is a schematic partially enlarged lateral sectional view showing a state where a head of a passenger is received, upon the completion of inflation of the airbag of FIG. 10.
Figure 14:
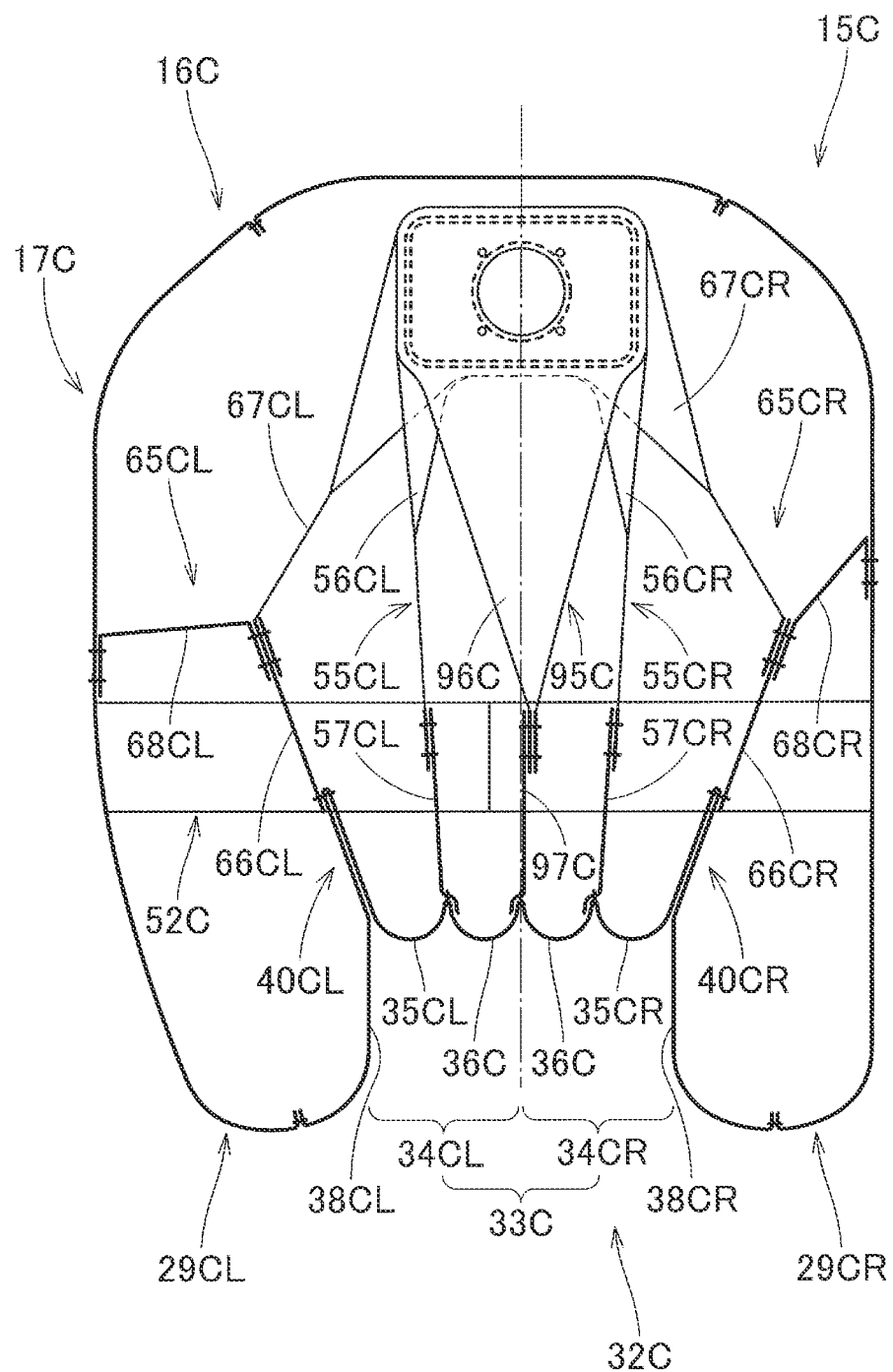
FIG. 14 is a schematic lateral sectional view showing a state where an airbag according to still another one of the embodiments of the disclosure is inflated alone.
Figure 15:
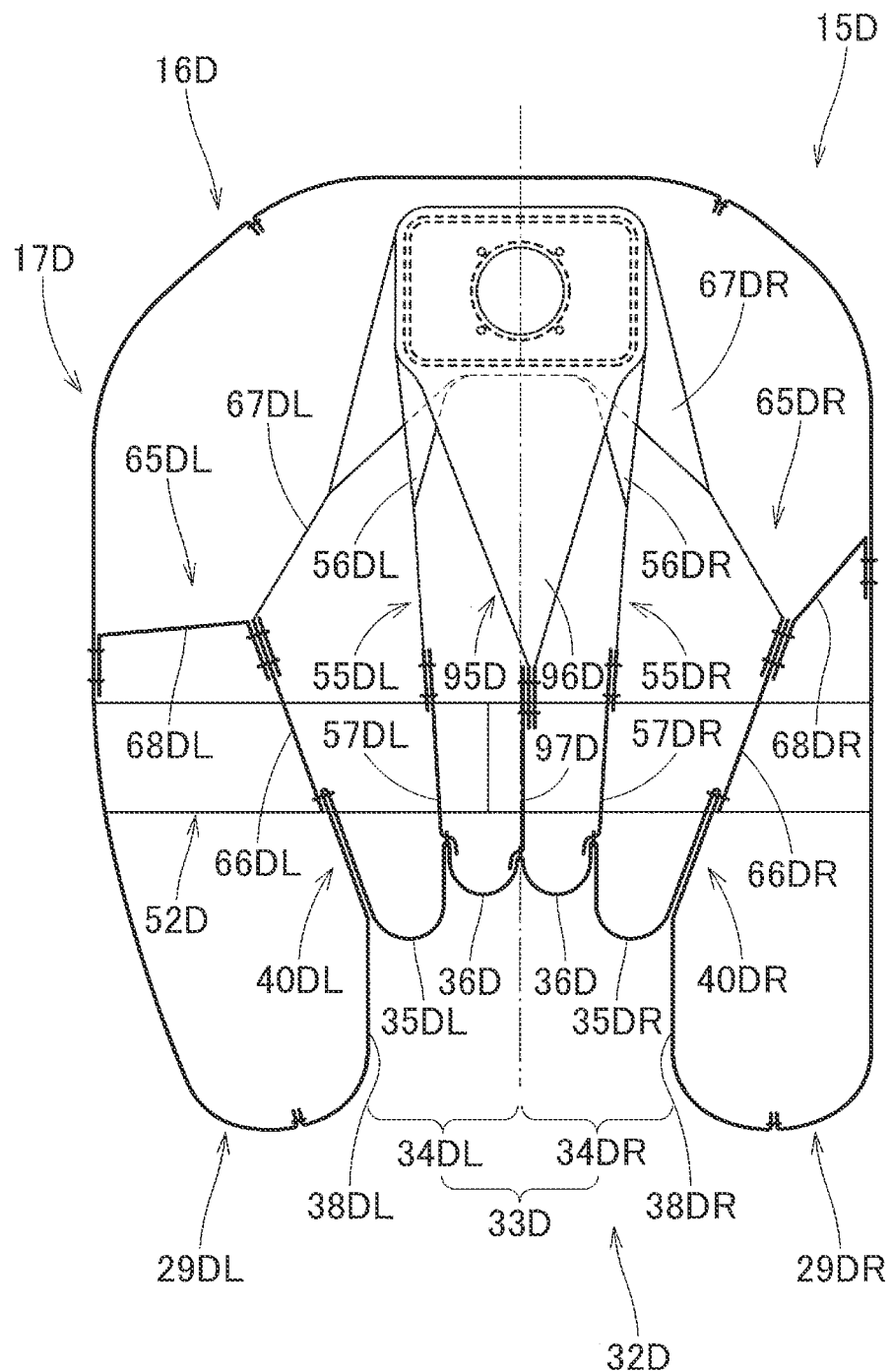
FIG. 15 is a schematic lateral sectional view showing a state where an airbag according to still another one of the embodiments of the disclosure is inflated alone.
Figure 16:
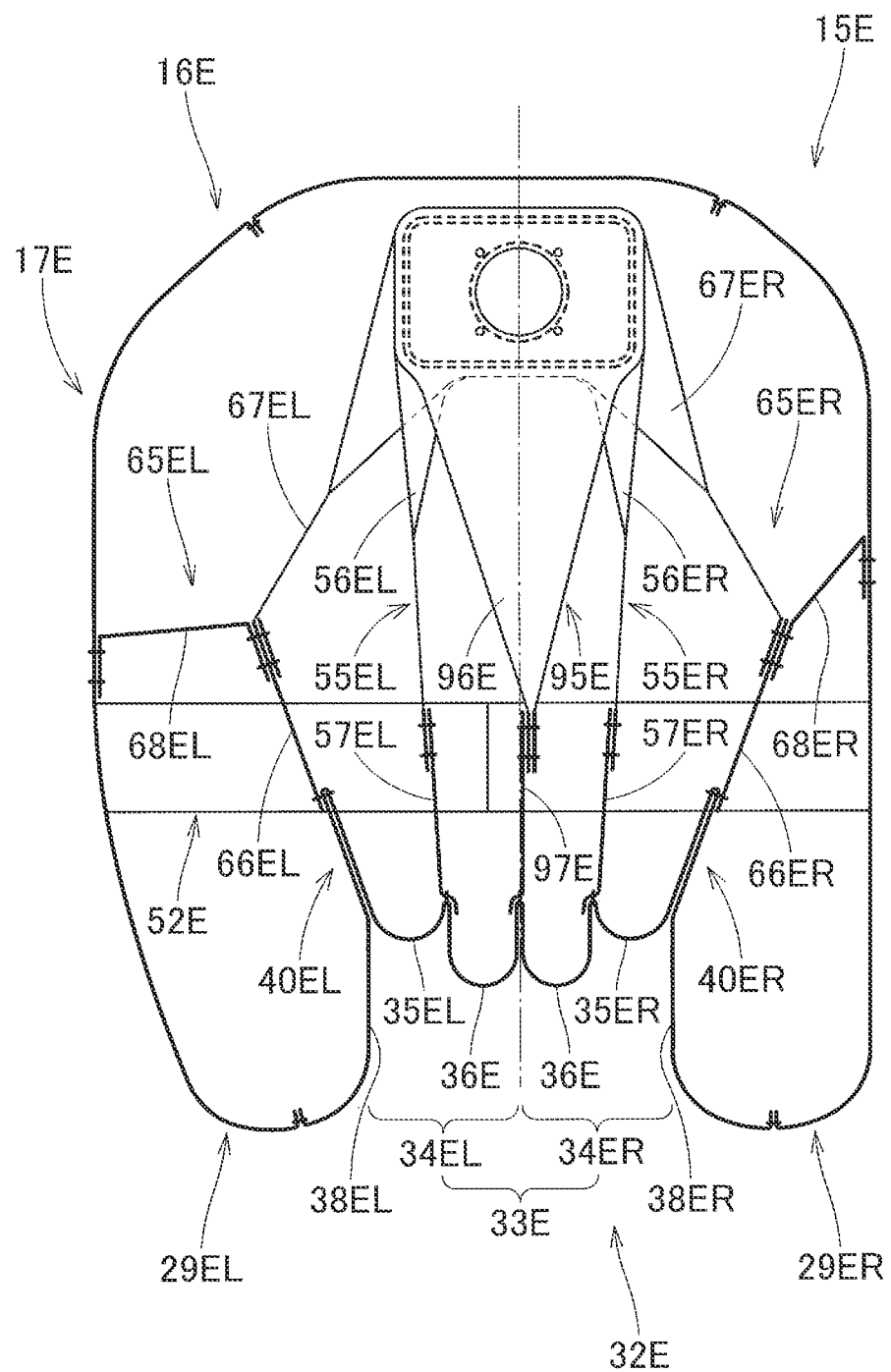
FIG. 16 is a schematic lateral sectional view showing a state where an airbag according to still another one of the embodiments of the disclosure is inflated alone.

In the airbag 15 according to the embodiment, the amount of backward protrusion of the left protruding surface 35L (the right protruding surface 35R) and the amount of backward protrusion of the central protruding surface 36 are equal to each other. However, as in the case of an airbag 15A shown in FIG. 10, it is also appropriate to adopt a configuration in which a left protruding surface 35AL that is formed in such a manner as to continue from a left restraint recess portion 40AL serves as a recess portion-side protruding surface and is arranged in such a manner as to protrude further backward than a central protruding surface 36A as an adjacent protruding surface that is adjacent to a center side of the left protruding surface 35AL in the lateral direction, upon the completion of inflation of the airbag. If the airbag 15A is thus configured, the head MH of the passenger MP that moves diagonally leftward and forward can be restrained from coming into contact with the central protruding surface 36A as the adjacent protruding surface, and can be reliably brought into contact only with the left protruding surface 35AL as the recess portion-side protruding surface that is arranged on the left restraint recess portion 40AL side (see FIG. 11), and the left protruding surface 35AL can be more adequately restrained from rotating the head MH of the passenger MP. The shape of this airbag 15A upon the completion of inflation thereof is also substantially bilaterally symmetric. The embodiment illustrated in FIG. 10 uses reference "A" and illustrates, e.g., front inner sections 67AL, 67AR, and front outer sections 68AR, 68AL, which correlate respectively to previously described reference numbers 67L, 67R, 68R, 68L, and so on. The embodiment illustrated in FIG. 12 uses reference "B", e.g., 67BL, 67BR, 68BR, 68BL, and so on. The embodiment illustrated in FIG. 14 uses reference "C", e.g., 67CL, 67CR, 68CR, 68CL, and so on. The embodiment illustrated in FIG. 15 uses reference "D", e.g., 67DL, 67DR, 68DR, 68DL, and so on. The embodiment illustrated in FIG. 16 uses reference "E", e.g., 67EL, 67ER, 68ER, 68EL, and so on.

Figure 12:
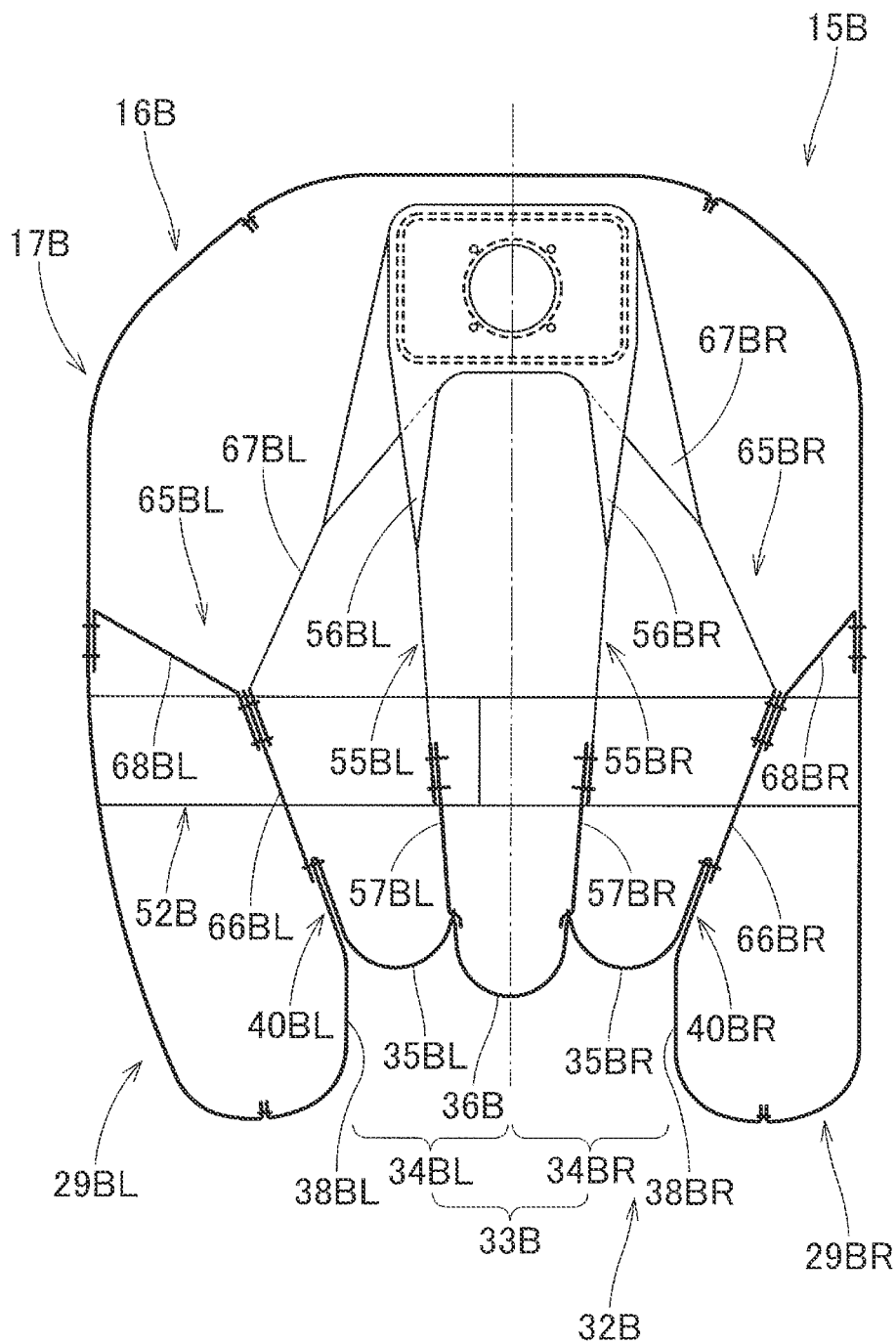
FIG. 12 is a schematic lateral sectional view showing a state where an airbag according to still another one of the embodiments of the disclosure is inflated alone.
Figure 13:
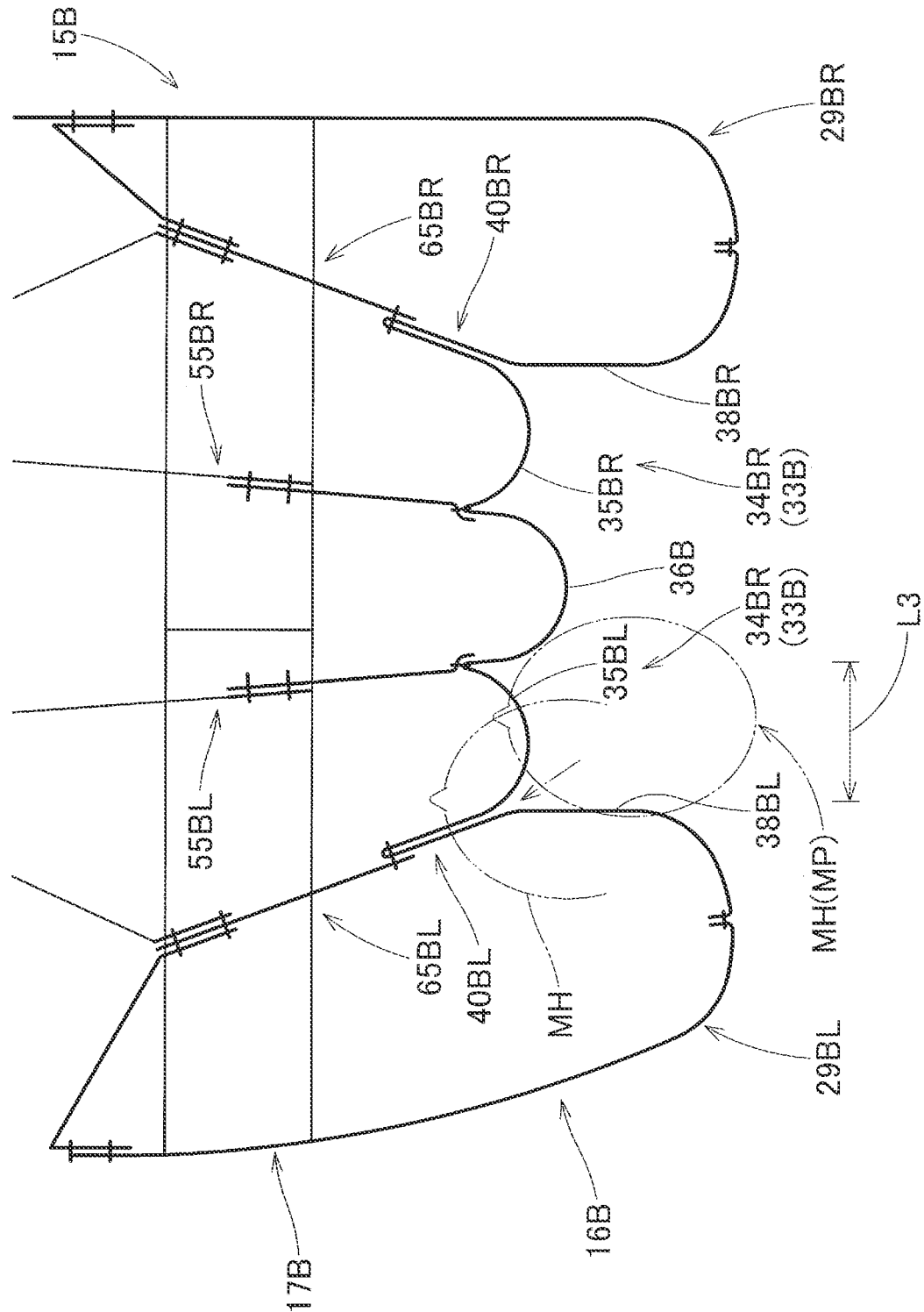
FIG. 13 is a schematic partially enlarged lateral sectional view showing a state where a head of a passenger is received, upon the completion of inflation of the airbag of FIG. 12.

Furthermore, as in the case of an airbag 15B shown in FIG. 12, it is also appropriate to adopt a configuration in which a left protruding surface 35BL (an end-side protruding surface) that is disposed on a left oblique collision restraint surface 38BL side is located in front of a central protruding surface 36B as an adjacent protruding surface that is adjacent to the left protruding surface 35BL on a lateral center side thereof, upon the completion of inflation of the airbag, as to the two protruding surfaces that are disposed on a frontal collision restraint surface 33B in an oblique collision-side region (a left region 34BL in the case of the embodiment) that is located on the left oblique collision restraint surface 38BL side with respect to a substantial center of the frontal collision restraint surface 33B in the lateral direction. That is, the airbag 15B shown in FIG. 12 is configured such that the frontal collision restraint surface 33B allows the two protruding surfaces (the left protruding surface 35BL and the central protruding surface 36B) to be juxtaposed from the center of the frontal collision restraint surface 33B in the lateral direction to the oblique collision-side region (the left region 34BL) on the left oblique collision restraint surface 38BL side, as far as the left oblique collision restraint surface 38BL, and that the left protruding surface 35BL (the end-side protruding surface) that is disposed on the left oblique collision restraint surface 38BL side is located in front of the central protruding surface 36B as the adjacent protruding surface that is adjacent to the left protruding surface 35BL on the lateral center side thereof, upon the completion of inflation of the airbag. In this airbag 15B, a width dimension L3 (see FIG. 13) of the left protruding surface 35BL in the lateral direction is preferably set equal to about 50 to 100 mm such that the head MH of the passenger MP can smoothly enter a space between the left oblique collision restraint surface 38BL and the central protruding surface 36B. In the embodiment, the width dimension L3 of the left protruding surface 35BL in the lateral direction is set equal to 70 mm. The shape of this airbag 15B upon the completion of inflation thereof is also substantially bilaterally symmetric.

When the airbag 15B thus configured is used, the central protruding surface 36B (the adjacent protruding surface) that is arranged on the center side in the lateral direction is configured to be arranged in such a manner as to protrude further backward than the left protruding surface 35BL as the end-side protruding surface that is arranged on the left oblique collision restraint surface 38BL side, upon the completion of inflation of the airbag 15B, and there is created a gap corresponding to the left protruding surface 35BL between the left protruding surface 35BL and the central protruding surface 36B. Thus, even when the head MH of the passenger MP that moves diagonally leftward and forward deviates more or less in the lateral direction, it is possible to cause the head MH of the passenger MP to smoothly enter the gap between the central protruding surface 36B and the left oblique collision restraint surface 38BL (see FIG. 13). Moreover, the head MH of the passenger MP can be adequately protected by restraining the head MH of the passenger MP from rotating toward the horizontal direction while holding the head MH of the passenger MP at three locations, namely, the left oblique collision restraint surface 38BL, the central protruding surface 36B, and the left protruding surface 35B such that the head MH of the passenger MP is sandwiched by the central protruding surface 36B and the left oblique collision restraint surface 38BL.

In the case where the airbag 15B is thus configured, the head of the passenger can be protected without hindrance even when there is adopted a configuration in which no left restraint recess portion is provided between the left oblique collision restraint surface 38BL and the left protruding surface 35BL (the frontal collision restraint surface 33B). However, when there is adopted a configuration in which a left restraint recess portion 40BL for restraining the head MH of the passenger MP by ensuring the entrance thereof into the space between the frontal collision restraint surface 33B and the left oblique collision restraint surface 38BL is formed in such a manner as to be recessed forward as in the case of the embodiment, the head MH of the passenger MP that moves diagonally forward can be protected by being further caused to enter the interior of the left restraint recess portion 40BL after being caused to enter the space between the central protruding surface 36B as the adjacent protruding surface and the left oblique collision restraint surface 38BL. As a result, the head MH of the passenger MP can be more adequately protected. In the case of a configuration that is equipped with the left restraint recess portion 40BL as in the embodiment, a left recess portion tether 65BL that couples a tip (the front end 40*a*) of a recess of the left restraint recess portion 40BL and a front end (the front end 17*a* of a body inflation portion 17B) side of the airbag 15B to each other serves also as a longitudinal tether that couples a left end side (a front end side of the left oblique collision restraint surface 38BL) of the frontal collision restraint surface 33B to the front end side of the airbag 15B. As a matter of course, if the foregoing is not taken into account, it is possible to adopt a configuration in which no restraint recess portion is arranged, as long as an airbag is configured such that an end-side protruding surface is located in front of an adjacent protruding surface. However, in the case of the configuration in which no restraint recess portion is arranged, a longitudinal tether that couples a boundary section between an oblique collision restraint surface and a frontal collision restraint surface to a front end side of the airbag needs to be separately arranged in this boundary section.

Each of the airbags 15, 15A, 15B according to the embodiment is configured such that the right oblique collision restraint surface 38R, 38AR, or 38BR and the left oblique collision restraint surface 38L, 38AL, or 38BL, and the right restraint recess portion 40R, 40AR, or 40BR and the left restraint recess portion 40L, 40AL, or 40BL are disposed on both the lateral sides of the frontal collision restraint surface 33, 33A, or 33B respectively, and that the two protruding surfaces 35R, 35L, 35AR, 35AL, or 35BR, 35BL, and 36, 36A, or 36B are formed on each of the right region 34R, 34AR, or 34BR and the left region 34L, 34AL, or 34BL of the frontal collision restraint surface 33, 33A, or 33B. Therefore, the head MH of the passenger MP that moves forward toward the vehicle exterior side (diagonally rightward and forward in the case of the embodiment) or forward toward the vehicle interior side (diagonally leftward and forward) can be adequately protected. Incidentally, if this point is not taken into account, the airbag may be configured such that the oblique collision restraint surface and the restraint recess portion are disposed on one of the right and left sides of the frontal collision restraint surface, and that the protruding surface is disposed only in one of the regions of the frontal collision restraint surface.

Incidentally, the differences in contour (protrusion state) among the protruding surfaces 35R, 35L, 35AR, 35AL, or 35BR, 35BL and 36, 36A, 36B of the airbag 15, 15A, or 15B can be appropriately changed by changing the length dimensions of the right longitudinal tether 55R, 55AR, or 55BR and the left longitudinal tether 55L, 55AL, or 55BL that are arranged inside, or changing the positions where the rear sections 57R and 57L, 57AR and 57AL, or 57BR and 57BL are linked with the rear wall portion 26, 26A, or 26B. In concrete terms, when the length dimensions of the right longitudinal tether 55AR and the left longitudinal tether 55AL are made shorter than the length dimensions of the right longitudinal tether 55R and the left longitudinal tether 55L of the airbag 15 respectively, or when the positions where the rear sections 57AR and 57AL are linked with the rear wall portion 26A are relatively deviated toward the center side in the lateral direction, the right protruding surface 35AR and the left protruding surface 35AL (the recess portion-side protruding surfaces) can be configured to protrude further backward than the central protruding surface 36A (the adjacent protruding surface), as is the case with the airbag 15A. On the contrary, when the length dimensions of the right longitudinal tether 55BR and the left longitudinal tether 55BL are made longer than those of the airbag 15, or when the positions where the rear sections 57BR and 57BL are linked with the rear wall portion 26B are relatively deviated outward in the lateral direction, the right protruding surface 35BR and the left protruding surface 35BL (the end-side protruding surfaces) can be configured to be located in front of the central protruding surface 36B (the adjacent protruding surface) as in the case of the airbag 15B.

Besides, each of the airbags 15, 15A, and 15B according to the embodiment is configured such that the three protruding surfaces 35R and 35L, 35AR and 35AL, or 35BR and 35BL, and 36, 36A, or 36B are juxtaposed in the entire lateral region of the frontal collision restraint surface 33, 33A, or 33B, but the number of protruding surfaces should not be limited as in the embodiment. As is the case with each of airbags 15C, 15D, and 15E shown in FIGS. 14 to 16 respectively, it is appropriate to adopt a configuration in which four protruding surfaces 35CR and 35CL, 35DR and 35DL, or 35ER and 35EL, and 36C and 36C, 36D and 36D, or 36E and 36E are juxtaposed in the entire lateral region of a frontal collision restraint surface 33C, 33D, or 33E, by juxtaposing the two central protruding surfaces 36C and 36C, 36D and 36D, or 36E and 36E (the adjacent protruding surfaces). Each of these airbags 15C, 15D, and 15E is configured such that the four protruding surfaces 35CR and 35CL, 35DR and 35DL, or 35ER and 35EL, and 36C and 36C, 36D and 36D, or 36E and 36E are juxtaposed on the frontal collision restraint surface 33C, 33D, or 33E, upon the completion of inflation of the airbag, by arranging a central longitudinal tether 95C, 95D, or 95E that couples a front end side of the airbag 15C, 15D, or 15E to the frontal collision restraint surface 33C, 33D, or 33E, between a right longitudinal tether 55CR, 55DR, or 55ER and a left longitudinal tether 55CL, 55DL, or 55EL. The central longitudinal tether 95C, 95D, or 95E is configured to couple a front section 96C, 96D, or 96E extending from the peripheral edge of the gas inflow port 21 and a rear section 97C, 97D, or 97E extending from a rear wall portion 26C, 26D, or 26E side (the frontal collision restraint surface 33C, 33D, or 33E side) to each other. Although not depicted in detail, the contour of the rear section 97C, 97D, and 97E is substantially the same as that of the rear section 57L of the above-mentioned left longitudinal tether 55L.

Besides, in each of these airbags 15C, 15D, and 15E as well, the difference in contour (protrusion state) among protruding surfaces 34CR and 34CL, 34DR and 34DL, or 34ER and 34EL, and 35C and 35C, 35D and 35D, or 35E and 35E can be appropriately changed by changing the length dimensions of the right longitudinal tether 55R, 55AR, or 55BR and the left longitudinal tether 55L, 55AL, or 55BL that are arranged inside, or changing the positions where rear sections 57CR and 57CL, 57DR and 57DL, or 57ER and 57EL are linked with the rear wall portion 26C, 26D, or 26E. In concrete terms, when the length dimensions of the right longitudinal tether 55DR and the left longitudinal tether 55DL are made shorter than the length dimensions of the right longitudinal tether 55CR and the length longitudinal tether 55CL of the airbag 15 in which the amounts of backward protrusion of all the protruding surfaces 35CR, 35CL, 36C, and 36C are equal to one another, respectively, or when the positions where the rear sections 57DR and 57DL are linked with the rear wall portion 26D are relatively deviated toward the center side in the lateral direction, the right protruding surface 35DR and the left protruding surface 35DL (the recess portion-side protruding surfaces) can be configured to protrude further backward than the central protruding surfaces 36D and 36D (the adjacent protruding surfaces), as is the case with the airbag 15D. On the contrary, when the length dimensions of the right longitudinal tether 55ER and the left longitudinal tether 55EL are made longer than those of the airbag 15C, or when the positions where the rear sections 57ER and 57EL are linked with the rear wall portion 26E are relatively deviated outward in the lateral direction, the right protruding surface 35ER and the left protruding surface 35EL (the end-side protruding surfaces) can be configured to be located in front of the central protruding surfaces 36E and 36E (the adjacent protruding surfaces) as in the case of the airbag 15E.

What is claimed is:

1. An airbag device for a front passenger seat, comprising:
an airbag that is accommodated in a folded state in an accommodation section in front of the front passenger seat, wherein
the airbag is configured such that a front end side thereof is attached to the accommodation section upon completion of inflation of the airbag, and that a rear surface side thereof serves as a passenger protection portion upon completion of inflation of the airbag,
the passenger protection portion has a frontal collision restraint surface that is configured to protect a head of a passenger that moves forward in an event of a frontal collision of a vehicle, an oblique collision restraint surface that is configured to protect the head of the passenger that moves diagonally forward in an event of an oblique collision or an offset collision of the vehicle and that is arranged on at least one of a right side and a left side of the frontal collision restraint surface, and a restraint recess portion that is configured to be recessed forward between the frontal collision restraint surface and the oblique collision restraint surface,
the airbag has a recess portion tether that couples a tip side of a recess of the restraint recess portion and the front end side of the airbag to each other, and at least one longitudinal tether that couples the front end side of the airbag and a recess portion-side region that is located on the restraint recess portion side with respect to a center of the frontal collision restraint surface in a lateral direction to each other, inside the airbag,
the frontal collision restraint surface has at least two protruding surfaces that are configured to protrude backward upon completion of inflation of the airbag due to the longitudinal tether,
the at least two protruding surfaces are arranged in alignment in the lateral direction, and
the restraint recess portion is inclined with respect to a longitudinal direction of the vehicle, such that a tip of the recess of the restraint recess portion is located outside a rear end of the recess with respect to an attachment centerline, upon completion of inflation of the airbag.

2. The airbag device according to claim 1, wherein
the oblique collision restraint surface is configured to protrude further backward than the frontal collision restraint surface upon completion of inflation of the airbag.

3. The airbag device according to claim 2, wherein
a recess portion-side protruding surface that is configured to continue from the restraint recess portion is configured to protrude further backward than an adjacent protruding surface that is arranged adjacent to the recess portion-side protruding surface at a center side thereof in the lateral direction, upon completion of inflation of the airbag, as to the at least two protruding surfaces.

4. The airbag device according to claim 1, wherein the recess portion tether corresponding to the restraint recess portion is inclined.

5. The airbag device according to claim 4, wherein the recess portion tether is connected to a front outer section linked with the airbag and a front inner section linked with an attachment portion.

6. The airbag device according to claim 1, wherein a depth of the restraint recess portion in the longitudinal direction is deeper than a depth formed between one protruding surface of the at least two protruding surfaces and another protruding surface of the at least two protruding surfaces.

7. An airbag device for a front passenger seat, comprising:
an airbag that is accommodated in a folded state in an accommodation section in front of the front passenger seat, wherein
the airbag is configured such that a front end side thereof is attached to the accommodation section upon completion of inflation of the airbag, and that a rear surface side thereof serves as a passenger protection portion upon completion of inflation of the airbag,
the passenger protection portion has a frontal collision restraint surface that is configured to protect a head of a passenger that moves forward in an event of a frontal collision of a vehicle, and an oblique collision restraint surface that is configured to protect the head of the passenger that moves diagonally forward in an event of an oblique collision or an offset collision of the vehicle and that is configured to protrude further backward than the frontal collision restraint surface on at least one of a right side and a left side of the frontal collision restraint surface,
the airbag has at least two longitudinal tethers that couple the front end side of the airbag and the frontal collision restraint surface to each other, inside the airbag,
the at least two longitudinal tethers are arranged deviated in a lateral direction from a center of the frontal collision restraint surface in the lateral direction to an oblique collision-side region on the oblique collision restraint surface side,
the frontal collision restraint surface has at least two protruding surfaces that are configured to protrude backward upon completion of inflation of the airbag,
the at least two protruding surfaces are arranged in alignment in the lateral direction,
the airbag has a restraint recess portion that is configured to be recessed forward between the frontal collision restraint surface and the oblique collision restraint surface,
an end-side protruding surface that is arranged on the oblique collision restraint surface side is configured to be located in front of an adjacent protruding surface that is arranged adjacent to the end-side protruding surface at a center side thereof in the lateral direction, upon completion of inflation of the airbag, as to the at least two protruding surfaces, and
the restraint recess portion is inclined with respect to a longitudinal direction of the vehicle, such that a tip of the recess of the restraint recess portion is located outside a rear end of the recess with respect to an attachment centerline, upon completion of inflation of the airbag.

8. The airbag device according to claim 7, wherein
the airbag has a recess portion tether that couples a tip side of the recess of the restraint recess portion and the front end side of the airbag to each other, inside the airbag, and
the recess portion tether serves also as one of the at least two longitudinal tethers.

9. The airbag device according to claim 7, wherein the recess portion tether corresponding to the restraint recess portion is inclined.

10. The airbag device according to claim 9, wherein the recess portion tether is connected to a front outer section linked with the airbag and a front inner section linked with an attachment portion.

11. The airbag device according to claim 7, wherein a depth of the restraint recess portion in the longitudinal direction is deeper than a depth formed between one protruding surface of the at least two protruding surfaces and another protruding surface of the at least two protruding surfaces.

* * * * *